US011280997B1

(12) United States Patent
Gao

(10) Patent No.: US 11,280,997 B1
(45) Date of Patent: Mar. 22, 2022

(54) LOW-OBLIQUITY PUPIL RELAY FOR TILTABLE REFLECTORS

(71) Applicant: Facebook Technologies, LLC, Menlo Park, CA (US)

(72) Inventor: Weichuan Gao, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 280 days.

(21) Appl. No.: 16/664,028

(22) Filed: Oct. 25, 2019

(51) Int. Cl.
| G02B 26/08 | (2006.01) |
| G02B 26/10 | (2006.01) |
| G02B 5/10 | (2006.01) |
| G02B 5/30 | (2006.01) |
| G02B 27/30 | (2006.01) |
| G02B 27/14 | (2006.01) |
| G02B 27/00 | (2006.01) |
| G03H 1/02 | (2006.01) |
| F21V 8/00 | (2006.01) |
| G02B 27/28 | (2006.01) |

(52) U.S. Cl.
CPC ............ *G02B 26/101* (2013.01); *G02B 5/10* (2013.01); *G02B 5/3083* (2013.01); *G02B 6/0016* (2013.01); *G02B 6/0076* (2013.01); *G02B 26/0833* (2013.01); *G02B 27/005* (2013.01); *G02B 27/0075* (2013.01); *G02B 27/0093* (2013.01); *G02B 27/141* (2013.01); *G02B 27/283* (2013.01); *G02B 27/30* (2013.01); *G03H 1/0248* (2013.01); *G03H 2222/36* (2013.01); *G03H 2240/15* (2013.01); *G03H 2250/38* (2013.01)

(58) Field of Classification Search
CPC .............. G02B 26/101; G02B 27/0093; G02B 27/005; G02B 27/283; G02B 6/0076; G02B 27/30; G02B 6/0016; G02B 5/3083; G02B 5/10; G02B 27/0075; G02B 26/0833; G02B 27/141; G03H 1/0248; G03H 2222/36; G03H 2240/15; G03H 2250/38
USPC ...................................................... 359/199.4
See application file for complete search history.

(56) References Cited

U.S. PATENT DOCUMENTS

| 9,958,684 B1* | 5/2018 | Robbins | ............. G02B 27/0081 |
| 2019/0278076 A1* | 9/2019 | Chen | .................... G02B 26/101 |

* cited by examiner

*Primary Examiner* — Euncha P Cherry
(74) *Attorney, Agent, or Firm* — Pequignot + Myers; Matthew A. Pequignot

(57) ABSTRACT

A beam scanner of a near-eye display includes a pair of tiltable reflectors and a beam-folding pupil relay coupling the tiltable reflectors optically together. The beam-folding pupil relay includes a beamsplitter for receiving the light beam reflected by the first tiltable reflector, and a first curved reflector for receiving the light beam from the beamsplitter, and for reflecting the light beam back towards the beamsplitter. The beam-folded pupil relay is configured to couple the light beam reflected by the first curved reflector to the second tiltable reflector. A second curved reflector may be provided for coupling the light beam scanned by the tiltable reflectors to a pupil-replicating waveguide. A controller may be provided for scanning the light beam in coordination with operating the light source at varying levels of brightness or color.

20 Claims, 15 Drawing Sheets

LOW-OBLIQUITY PUPIL RELAY FOR TILTABLE REFLECTORS

TECHNICAL FIELD

The present disclosure relates to wearable headsets, and in particular to components and modules for wearable visual display headsets.

BACKGROUND

Head mounted displays (HMD), helmet mounted displays, near-eye displays (NED), and the like are being used increasingly for displaying virtual reality (VR) content, augmented reality (AR) content, mixed reality (MR) content, etc. Such displays are finding applications in diverse fields including entertainment, education, training and biomedical science, to name just a few examples. The displayed VR/AR/MR content can be three-dimensional (3D) by providing individual images to each eye of the user. Eye position and gaze direction, and/or orientation of the user may be tracked in real time, and the displayed imagery may be dynamically adjusted depending on the user's head orientation and gaze direction, to match virtual objects to real objects observed by the user, and generally to provide an experience of immersion into a simulated or augmented environment.

Compact display devices are desired for head-mounted displays. Because a display of HMD or NED is usually worn on the head of a user, a large, bulky, unbalanced, and/or heavy display device would be cumbersome and may be uncomfortable for the user to wear.

Projector-based displays provide images in angular domain, which can be observed by a user directly, without an intermediate screen or a display panel. A waveguide may be used to carry the image in angular domain to the user's eye. The lack of a screen or high numerical aperture collimating optics in a scanning projector display enables size and weight reduction of the display. A scanner for a projector display needs to be fast, have a wide scanning range, and preserve the optical quality of the beam being scanned to form an image in angular domain.

BRIEF DESCRIPTION OF THE DRAWINGS

Exemplary embodiments will now be described in conjunction with the drawings, in which.

DETAILED DESCRIPTION

Figure 1:
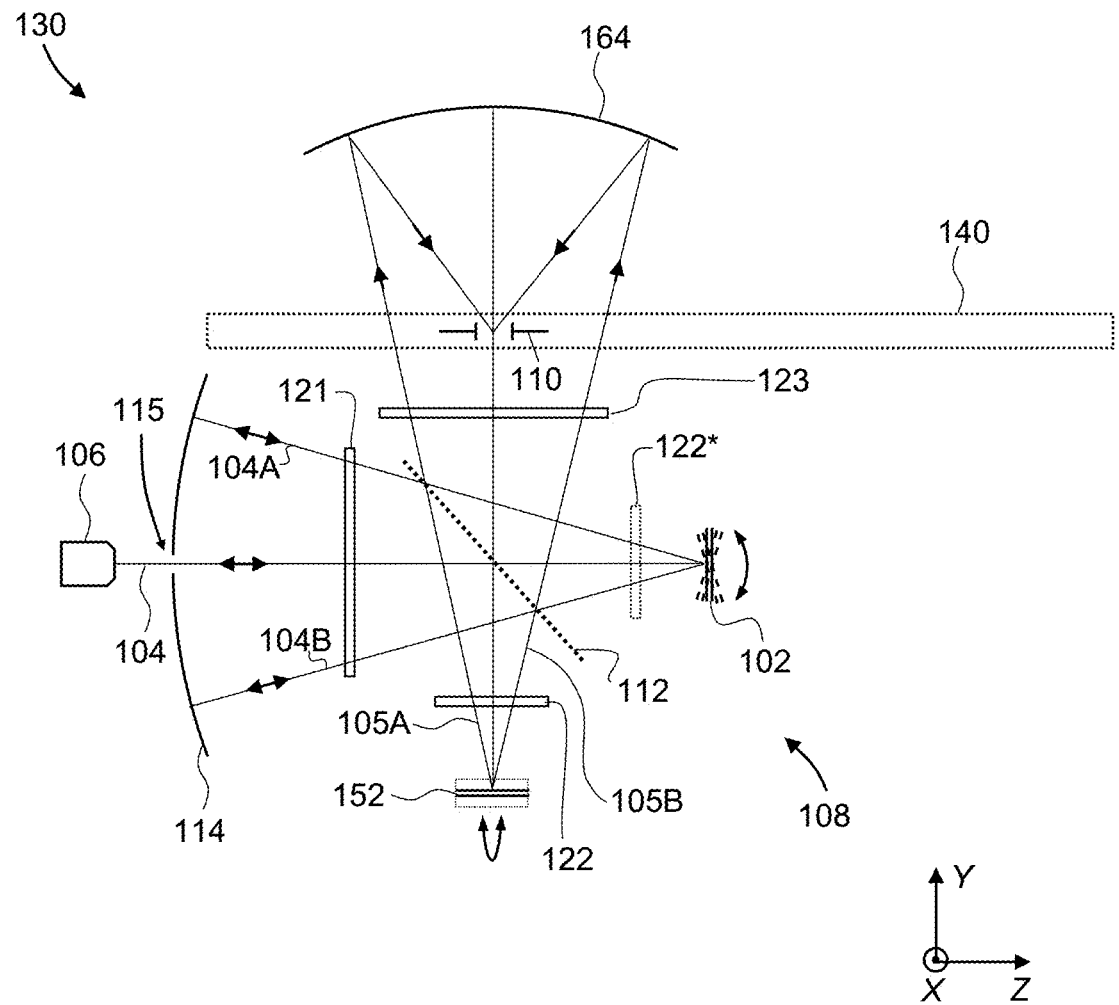
FIG. 1 is a schematic view of a beam scanner including a beam scanner including a pupil relay between tiltable reflectors, in accordance with the present disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 2A, 2B, 2C, 3A, 3B, 5A, 5B, 6A, 6B, 7A, 7B, and FIG. 10, similar reference numerals denote similar elements.

One or more tiltable reflectors may be used to scan a light beam emitted by a light source to form an image in angular domain for observation by a user of a near-eye display. As the light beam is scanned by the tiltable reflector(s), the brightness and/or color of the scanned light beam are varied in coordination with the scanning, in accordance with corresponding pixels of the image to be displayed. The entire image is formed when the light beam is scanned in two dimensions, e.g. over X- and Y-viewing angles, over the entire frame or field of view (FOV) of the display. When the frame rate is high enough, the eye integrates the scanned light beam, enabling the user to see the displayed imagery substantially without flicker.

One challenge associated with some near-eye display image scanners is reduction of field of view (FOV) caused by an oblique angle of incidence of the light beam onto a tiltable reflector of the beam scanner. The oblique angle may be required by the optical geometry used, e.g. to physically separate an impinging light beam from the scanned, i.e. reflected, light beam. The FOV reduction is caused by distortion of the solid angle representing the range of scanning at oblique angles of incidence of light beam at the tiltable reflector.

A scanned light beam may be coupled to an input grating of a pupil-replicating waveguide. The function of the input grating is to couple the impinging light beam to propagate in the waveguide, e.g. by total internal reflection (TIR). Another challenge associated with some near-eye display image scanners is that the light beam shifts along the input grating as it is scanned, which requires the size of the input grating to be increased to capture the scanned light beam at the extreme scanning angles. Light redirected by a large input grating may impinge on the input grating several times as it propagates by TIR inside the waveguide, causing brightness and power loss and worsening a modulation transfer function (MTF) of the image being displayed to the user.

In most scanning displays, the scanning needs to be performed about two non-parallel axes of scanning. A single 2D tiltable reflector may be used for this purpose. Alternatively, two 1D tiltable reflectors may be used. Although this may simplify the scanner construction, the optics required to couple two tiltable reflectors may be comparatively large and complex.

In accordance with the present disclosure, a pupil relay may be used to couple two tiltable reflectors, as well as to compensate for the scanned beam travel, such that regardless of the beam angle, the beam always propagates through a same location at an exit pupil of the pupil relay, albeit at different angles. The output light beam of the pupil relay may be spatially separated from the input light beam by polarization. This obviates the need in geometrical separation of the beams by oblique angles of incidence, resulting in a compact configuration providing a nearly straight angle of incidence at the tiltable reflector when the latter is in a center (non-tilted) angular position. Low obliquity of the impinging light beam enables the scanning range to be utilized more efficiently. A reduced beam walk enables one to reduce the size of the input grating of a pupil-replicating waveguide, thus improving the image MTF.

In accordance with the present disclosure, there is provided a beam scanner comprising a first tiltable reflector for reflecting a light beam at a variable angle in a first plane; a second tiltable reflector for reflecting the light beam at a variable angle in a second plane; and a beam-folded pupil relay for receiving the light beam from the first tiltable reflector and relaying the light beam to the second tiltable reflector. The beam-folded pupil relay includes a beamsplitter for receiving the light beam reflected by the first tiltable reflector; and a first curved reflector for receiving the light beam from the beamsplitter, and for reflecting the light beam back towards the beamsplitter. The beam-folded pupil relay is configured to couple the light beam reflected by the first curved reflector to the second tiltable reflector. The first curved reflector may have a radius of curvature substantially equal to an optical path length from the first tiltable reflector to the first curved reflector, and to an optical path length from the second tiltable reflector to the first curved reflector. The first and second tiltable reflectors may each include a tiltable microelectromechanical system (MEMS) reflector.

In embodiments where the beamsplitter comprises a polarization beamsplitter (PBS) configured to reflect light having a first polarization state and to transmit light having a second polarization state orthogonal to the first polarization state, the beam scanner may further include: a first quarter-wave waveplate (QWP) disposed in an optical path between the PBS and the first curved reflector and configured to convert polarization of the light beam upon double pass through the first QWP between the first and second polarization states; and a second QWP disposed in an optical path between the PBS and the second tiltable reflector and configured to convert polarization of the light beam upon double pass through the second QWP between the first and second polarization states.

The beam scanner may further include a second curved reflector and a third QWP. The second curved reflector is configured to receive the light beam from the beamsplitter after reflection from the first and second tiltable reflectors and reflect the light beam to an exit pupil of the beam scanner. The third QWP may be disposed in an optical path between the beamsplitter and the second curved reflector and configured to convert polarization of the light beam propagated therethrough to a circular polarization. In some embodiments, the first curved reflector and the first tiltable reflector are disposed on opposite sides of the beamsplitter, and the second curved reflector and the second tiltable reflector are disposed on opposite sides of the beamsplitter. The beam scanner may further include a first lens in an optical path between the first tiltable reflector and the PBS, for collimating the light beam impinging onto the first tiltable reflector, and a second lens in an optical path between the second tiltable reflector and the PBS, for collimating the light beam impinging onto the second tiltable reflector.

The first and second curved reflectors may each include a meniscus lens having a proximal concave surface and a distal convex surface, and a reflective coating at the distal convex surface. In embodiments where the light beam comprises first and second color channel components, the reflective coating of at least one of the first or second curved reflectors may include a first dichroic coating for reflecting the first color channel component and a second coating for reflecting the second color channel component. The first dichroic coating and the second coating may be disposed at different distances from the proximal concave surface of the meniscus lens.

In accordance with the present disclosure, there is provided a projector comprising a light source for providing a light beam, and any of the beam scanners described above coupled to the light source for receiving the light beam. In embodiments where the first curved reflector and the first tiltable reflector are disposed on opposite sides of the beamsplitter, and where the second curved reflector and the second tiltable reflector are disposed on opposite sides of the beamsplitter, the first curved reflector may include an opening for coupling the light beam from the light source to the beamsplitter.

In accordance with the present disclosure, there is further provided a near-eye display for providing an image in angular domain to an eyebox of the near-eye display. The near-eye display includes a first tiltable reflector for reflecting the light beam at a variable angle in a first plane, a second tiltable reflector for reflecting the light beam at a variable angle in a second plane, and a beam-folded pupil relay described above. The beam-folded pupil relay may be configured for receiving the light beam from the first tiltable reflector and relaying the light beam to the second tiltable reflector. By way of a non-limiting example, the beam-folded pupil relay may include: a beamsplitter for receiving the light beam reflected by the first tiltable reflector; a first curved reflector for receiving the light beam from the beamsplitter, and for reflecting the light beam back towards the beamsplitter, wherein the beam-folded pupil relay is configured to couple the light beam reflected by the first curved reflector to the second tiltable reflector; and a second curved reflector configured to receive the light beam from the beamsplitter after reflection from the first and second tiltable reflectors, and to reflect the light beam to an exit pupil of the beam scanner.

A pupil-replicating waveguide may be provided in the near-eye display. The pupil-replicating waveguide may include a polarization-selective input grating for coupling the light beam into the pupil-replicating waveguide, wherein the polarization-selective input grating is disposed proximate the exit pupil of the beam scanner for receiving the light beam reflected by the second curved reflector. In embodiments where the beamsplitter comprises a PBS configured to reflect light having a first polarization state and to transmit light having a second polarization state orthogonal to the first polarization state, the beam scanner may further include first, second, and third QWPs. The first QWP may be disposed in an optical path between the PBS and the first curved reflector and configured to convert polarization of the light beam upon double pass through the first QWP between the first and second polarization states. The second QWP may be disposed in an optical path between the PBS and the second tiltable reflector and configured to convert polarization of the light beam upon double pass through the second QWP between the first and second polarization states. The third QWP may be disposed in an optical path between the beamsplitter and the second curved reflector and configured to convert polarization of the light beam propagated therethrough to a circular polarization of a first handedness. The polarization-selective input grating may be configured to propagate substantially without diffraction circularly polarized light of the first handedness, and to diffract circularly polarized light of a second handedness opposite to the first handedness. The polarization-selective input grating may include a polarization volume hologram.

In some embodiments, the near-eye display further includes a controller operably coupled to the light source and the first and second tiltable reflectors and configured to: operate the first and second tiltable reflectors to cause the light beam at the exit pupil of the beam-folded pupil relay to have a beam angle corresponding to a pixel of an image to be displayed; and operate the light source in coordination with operating the first and second tiltable reflectors, such that the light beam has brightness corresponding to the pixel of the image to be displayed.

In some embodiments, the first and second tiltable reflectors are both tiltable about two axes. The near-eye display may further include an eye tracker operably coupled to the controller and configured to determine a gaze direction of a user of the near-eye display. The controller may be is further configured to: operate the first tiltable reflector to scan the light beam to form an image in angular domain for displaying to the user; use the eye tracker to determine the gaze direction of the user; and operate the second tiltable reflector to shift a field of view towards the gaze direction of the user.

Various exemplary embodiments of a beam scanner will now be considered. Referring to FIG. 1, a beam scanner 130 includes a first tiltable reflector 102 for reflecting a light beam 104 provided by a light source 106. The reflection occurs at a variable angle in a first plane, e.g. in YZ plane (up and down in plane of FIG. 1). A second tiltable reflector 152 is provided for reflecting the light beam 104 at a variable angle in a second plane, e.g. XY plane (out of plane of FIG. 1). A beam-folded pupil relay 108 is configured to receive the light beam 104 from the first tiltable reflector 102 and relay the light beam 104 to the second tiltable reflector 152.

In the embodiment shown, the beam-folded pupil relay 108 includes a beamsplitter 112 and a first curved reflector 114. The light source 106 emits the light beam 104, which may propagate through an opening 115 in the first curved reflector 114, and through the beamsplitter 112 towards the first tiltable reflector 102. The beamsplitter 112 is configured to receive the light beam 104 reflected by the first tiltable reflector 102, and to transmit the light beam 104 back towards the first curved reflector 114. The first curved reflector 114 is configured to receive the light beam 104 propagated through the beamsplitter 112, and to reflect the light beam 104 back towards the beamsplitter 112. In the embodiment shown, the light beam 104 is reflected to propagate back substantially along an optical path of the impinging light beam.

The backward reflection occurs regardless of the angle of tilt of the tiltable reflector 102. For example, in FIG. 1, a first reflected beam 104A (at an upward-tilted tiltable reflector 102) is reflected by the beamsplitter 112 to propagate back through a first optical path 105A, and a second reflected beam 104B (at a downward-tilted tiltable reflector 102) is at reflected by the beamsplitter 112 to propagate back through a second optical path 105B. To achieve backreflection, the curved reflector 114 may have a radius of curvature substantially equal to an optical path length from the first tiltable reflector 102 to the first curved reflector 114. At this condition, the light beam 104 reflected from the tiltable reflector 102 will always propagate along a radius of curvature of the curved reflector 114, and consequently will always be at a normal (zero) angle of incidence at the curved reflector 114, and will get retroreflected.

In some embodiments, the opening 115 is disposed off-center w.r.t. the first curved reflector 114. The shift may be significant enough to place the impinging light beam 104 outside the scanning range of the tiltable reflector 102. Shifting the opening 115 outside the scanning range of the tiltable reflector 102, i.e. outside of the FOV of the display, may effectively remove a dimming artifact where the image is dimmer on one area corresponding to the field angle at which the light beam 104 reflected from the first tiltable reflector 102 propagates back through the opening 115. It is further noted that, if the opening 115 is disposed outside of the display FOV, the first tiltable reflector 102 may need to be pre-tilted.

The beamsplitter 112 is configured to reflect the light beam 104 back-reflected by the curved reflector 114 to the second tiltable reflector 152. An optical path length from the first reflector 114 to the second tiltable reflector 152 may be also equal to the radius of curvature of the curved reflector 114. At this condition, the light beam 104 will always be centered on the second tiltable reflector 152, regardless of the angle of tilt of the first tiltable reflector 102, as shown. When the two optical paths are equal, the magnification along the optical path from the first tiltable reflector 102 to the second tiltable reflector 152 is equal to unity.

In some embodiments, the two paths are not equal. In other words, the path length between the first curved reflector 114 and the first tiltable reflector 102 may be different from a path length between the first curved reflector 114 and the second tiltable reflector 152. Thus results in the magnification greater or less than unity. It is noted that the magnification of the pupil results in de-magnification of the scanning range, and vice versa.

To preserve optical power of the light beam 104, the light source 106 of the beam scanner 130 may be constructed to emit polarized light, and the beamsplitter 112 may be made polarization-selective, i.e. configured to reflect light having a first polarization state orthogonal and to transmit light having a second polarization state orthogonal to the first polarization state. The polarization state of the light beam 104 may be manipulated by using polarization-converting optical elements such as waveplates to ensure the desired folded beam path. For example, a first quarter-wave waveplate (QWP) 121 may be disposed in an optical path between the beamsplitter 112 and the first curved reflector 114 and configured to convert polarization of the light beam 104 upon double pass through the first QWP 121 between the first and second polarization states. This will ensure that the light beam 104 will not repeat its path through the beamsplitter 112, i.e. if the light beam transmitted through the beamsplitter 112 on the first pass, e.g. before impinging onto the first curved reflector 114, the light beam 104 will be reflected by the beamsplitter 112 on the second pass towards the second tiltable reflector 152, and vice versa.

A second QWP 122 may be disposed in an optical path between the beamsplitter 112 and the second tiltable reflector 152 and configured to convert polarization of the light beam upon double pass through the second QWP122 between the first and second polarization states. Again, this will ensure that the light beam 104 will not repeat its path through the beamsplitter 112, i.e. if the light beam 104 was reflected by the PBS 122 towards the second tiltable reflector 152 on the first pass, it will then propagate through the PBS 122 on the second pass, i.e. upwards in FIG. 1, as shown.

In some embodiments, the beam scanner 130 further includes a second curved reflector 164 configured to receive the light beam 104 from the beamsplitter 112 after reflecting from the first 102 and second 152 tiltable reflectors as described above. The second curved reflector 164 and the second tiltable reflector 152 are disposed on opposite sides of the beamsplitter 112; and, for that matter, the first curved reflector 114 and the first tiltable reflector 102 are also disposed on opposite sides of the beamsplitter, resulting in a compact overall configuration. In operation, the second curved reflector 164 reflects the light beam 104 to an exit pupil 110 of the beam scanner 130.

A receiving optical device, such as a pupil-replicating waveguide 140, may be disposed at or proximate the exit pupil 110 for receiving the light beam 104. The pupil-replicating waveguide 140 may include a polarization-selective element sensitive to handedness of circular polarization of light. A third QWP 123 may be disposed in an optical path between the beamsplitter 112 and the second curved reflector 164 and configured to convert polarization of the light beam propagated therethrough to a circular polarization of a handedness that causes the light beam 104 to propagate through the pupil-replicating waveguide 140. Upon reflecting from the second curved reflector 164, the handedness of the circularly polarized light beam 104 will change to an opposite handedness, causing the polarization-selective element to redirect the light beam for propagation in the pupil-replicating waveguide 140. It is noted that the polarization-selective element may be sensitive to circular polarization, linear polarization, and generally to any two orthogonal states of polarization.

Figure 2A:
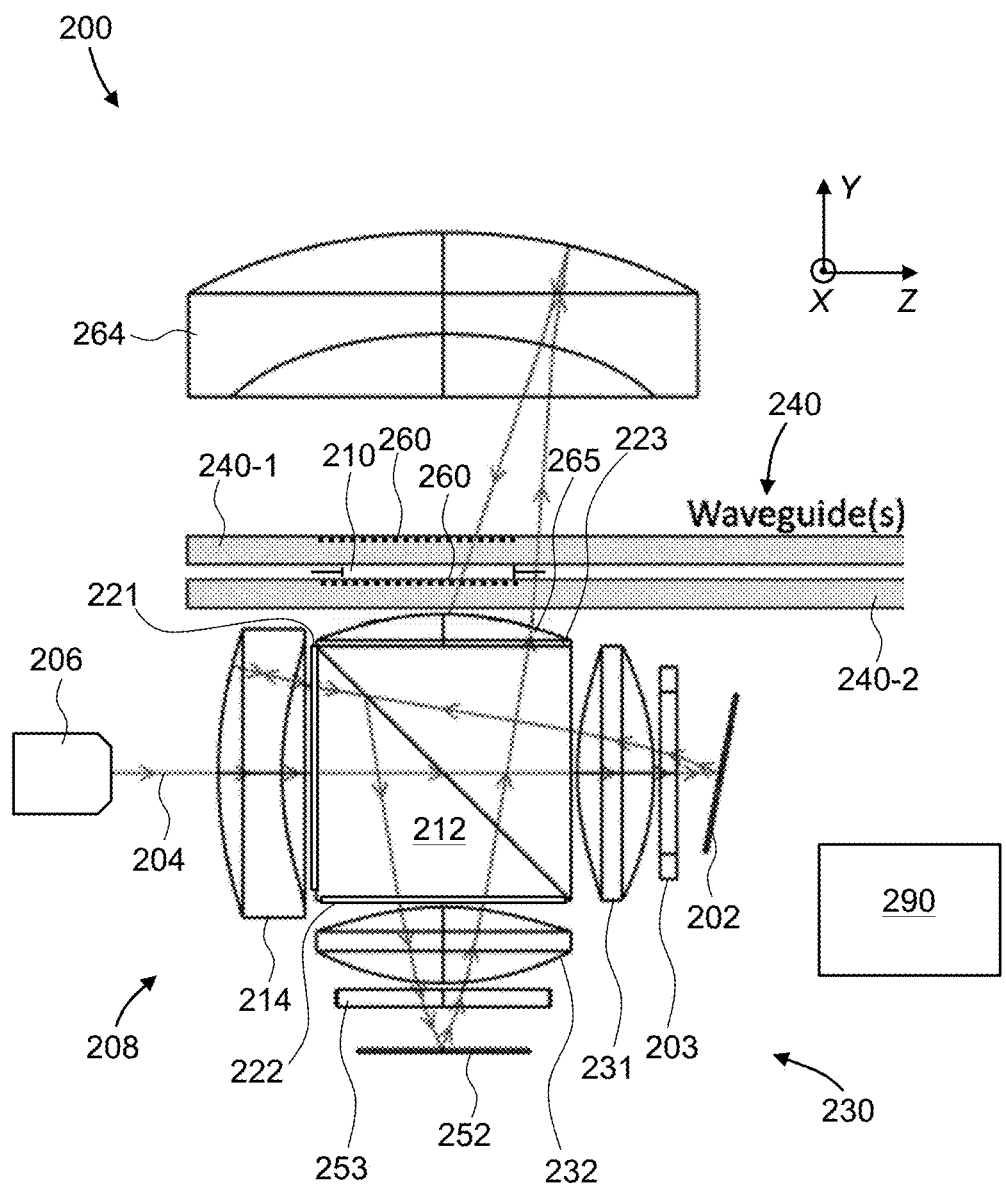
FIGS. 2A and 2B are a schematic ray-traced side views of a near-eye display including the beam scanner of FIG. 1.
Figure 2B:
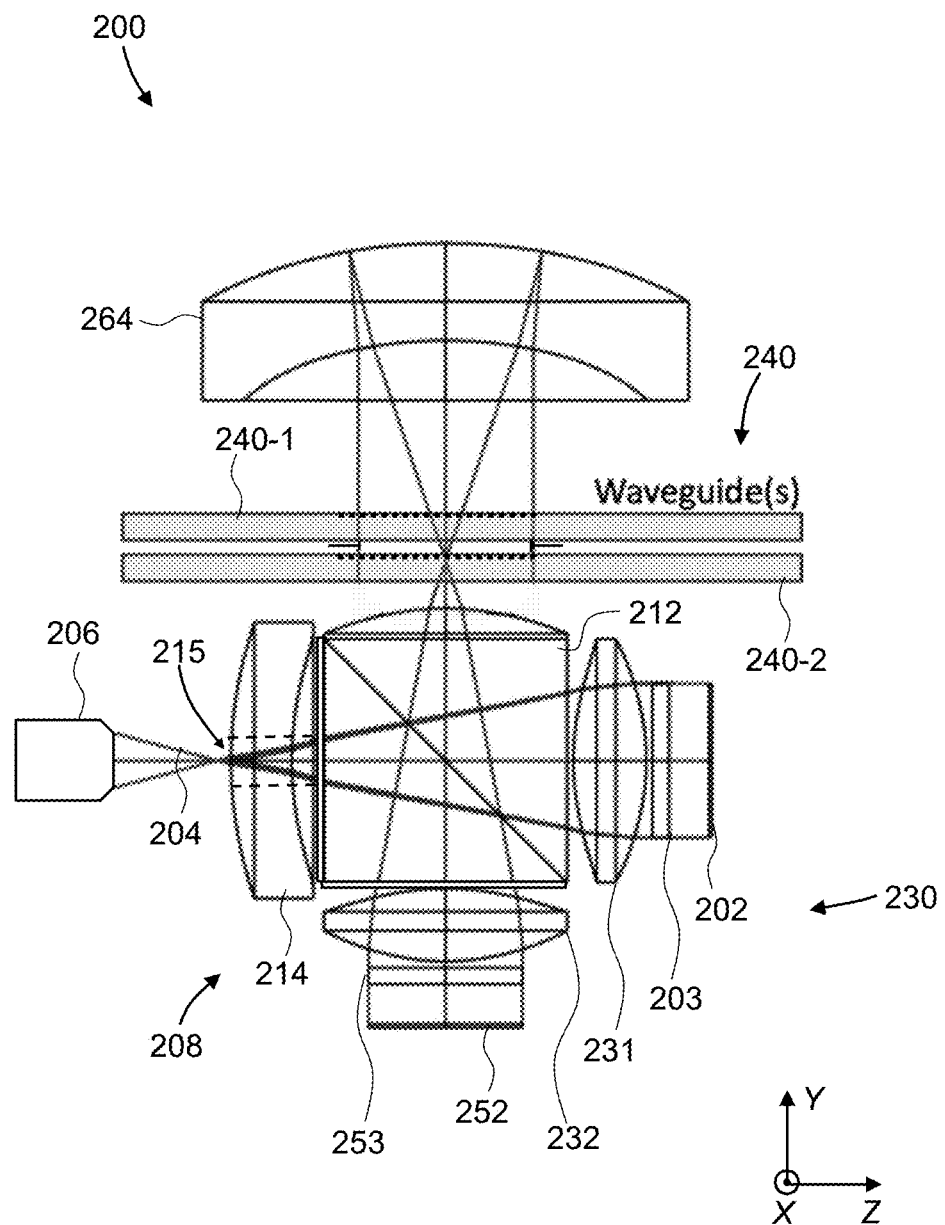
Figure 2C:
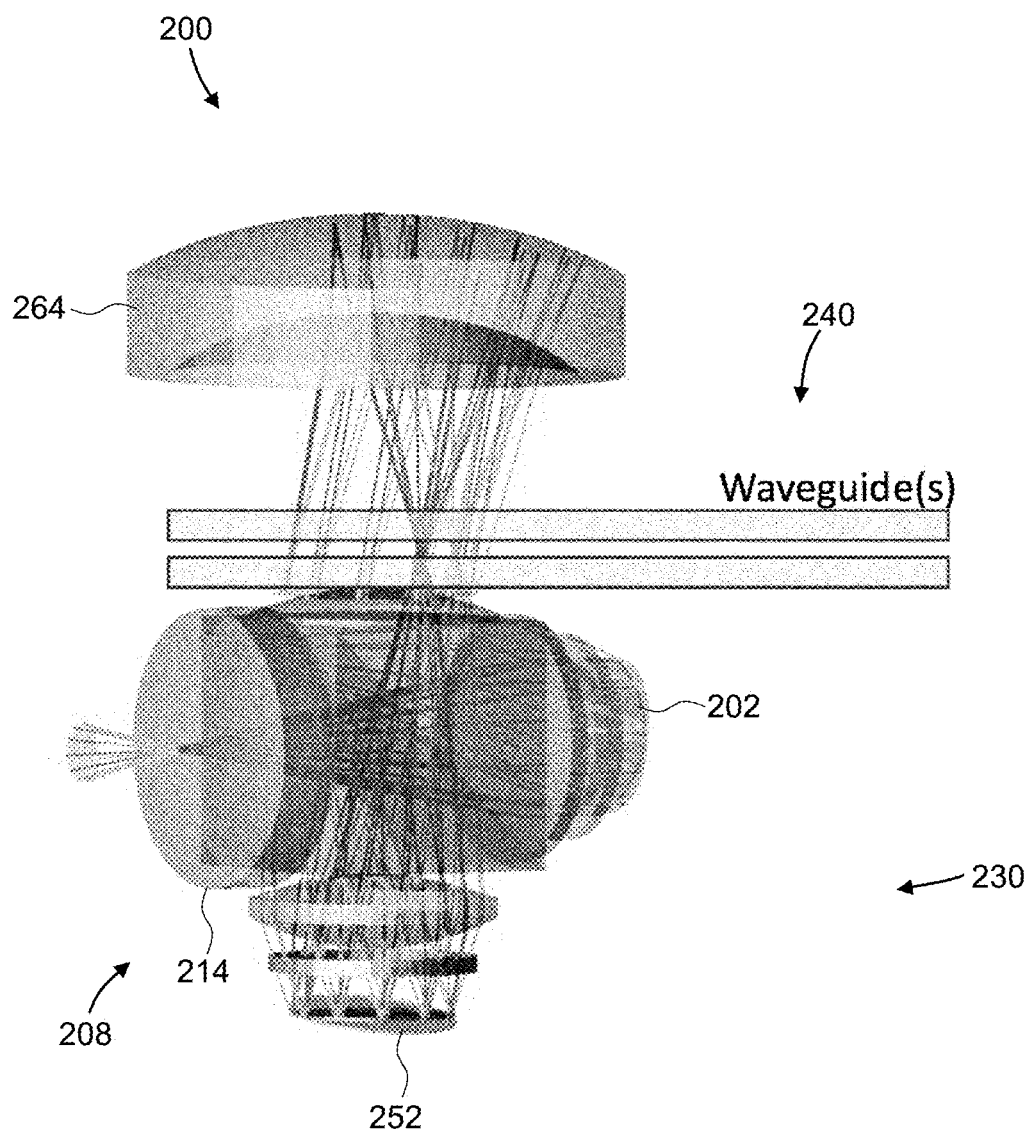
FIG. 2C is a ray-traced three-dimensional view of the near-eye display of FIGS. 2A and 2B.

FIGS. 2A, 2B, and 2C show a near-eye display 200 including a pupil-replicating waveguide assembly 240 optically coupled to a beam scanner 230 configured to receive a light beam 204 from a light source 206. The pupil-replicating waveguide assembly 240 may have one, two, three or more waveguides. Two waveguides, 240-1 and 240-2, are shown as an example. The beam scanner 230 includes first 202 and second 252 tiltable reflectors optically coupled to each other via a beam-folded pupil relay 208, which is similar to the beam-folded pupil relay 108 of FIG. 1. The first 202 and second 252 tiltable reflectors (FIG. 2A) may be microelectromechanical (MEMS) 1D or 2D tiltable reflectors, and may be disposed in hermetic packages having transparent windows 203 and 253, respectively. A controller 290 may be operably coupled to the first 202 and second 252 tiltable reflectors and the light source 206.

The beam-folded pupil relay 208 includes a polarization beamsplitter (PBS) 212 and first 214 and second 264 curved reflectors, each of which in this embodiment includes a meniscus lens having a reflective coating on its distal (i.e. farthest form the PBS 212) convex surface. The PBS 212 is configured to reflect light having a first polarization state polarized perpendicular to the plane of FIG. 2 (i.e. XZ plane), and to transmit light having a second polarization state polarized in plane of FIG. 2 (i.e. YZ plane) in this example. The second polarization state is orthogonal to the first polarization state.

Similarly to the beam-folding relay 108 of FIG. 1, the beam-folded pupil relay 208 of FIG. 2A may further include first 221 and second 222 QWPs. The first QWP 221 is disposed in an optical path between the PBS 212 and the first curved reflector 214. The first QWP 221 may be oriented such that a polarization state of a light beam changes to an orthogonal polarization state upon double passing the first QWP 221, i.e. from the first polarization state to the second polarization state, and from the second polarization state to the first polarization state. The second QWP 222 is disposed in an optical path between the second tiltable reflector 252 and the PBS 212, and may also be oriented to convert between two orthogonal polarization states upon double pass. A first lens 231 may be disposed in an optical path between the first tiltable reflector 212 and the PBS 212, for collimating the impinging diverging light beam 204, as well as for focusing the light beam 204 reflected by the first tiltable reflector 202 to propagate towards the PBS 212. A second lens 232 may be disposed in an optical path between the PBS 212 and the second tiltable reflector 252, for collimating the impinging diverging light beam 204, as well as for focusing the light beam 204 reflected by the second tiltable reflector 252 to propagate towards the PBS 212.

In operation, the light source 206 emits the light beam 204, which has a circular polarization in this example. Upon a first propagation through the first QWP 221, the light beam 204 is in the second polarization state, which is in YZ plane in this example. Since the light beam 204 is in the second polarization state, it propagates through the PBS 212 substantially without a reflection loss. Then, the light beam 204 is reflected by the first tiltable reflector 202 and is reflected back to the first curved reflector 214, thus propagating through the first QWP 221 again. The first curved reflector 214 reflects the light beam again through the first QWP 221, which changes the polarization state of the light beam 204 to the first polarization state, i.e. linearly polarized in XY plane, and is reflected by the PBS 212 towards the second tiltable reflector 252. Upon double passing the second QWP 222, the light beam 204 becomes linearly polarized in YZ plane again (second polarization state and propagates through the PBS 212. A third QWP 223 makes the propagating light beam 204 circularly polarized at a first handedness of circular polarization.

In the embodiment shown, the waveguide assembly 240 of the near-eye display 200 includes two pupil-replicating waveguides, 240-1 and 240-2. At least one pupil-replicating waveguide may be provided. Each pupil-replicating waveguide 240-1 and 240-2 includes a polarization-selective input grating 260, which is configured to propagate the circularly polarized light beam 204 of the first handedness. Then, the light beam 204 is reflected back by the second curved reflector 264, towards an exit pupil 210 located between the polarization-selective input gratings 260 of the pupil-replicating waveguides 240-1 and 240-2. Upon reflection from the second curved reflector 264, the handedness of circular polarization of the light beam 204 changes to the opposite handedness, and the polarization-selective input gratings 260 redirect the light beam 204 to propagate in the pupil-replicating waveguides 240-1 and 240-2.

In some beam scanners disclosed herein, the order of light propagation in the pupil relay may be reversed, such that the light propagates from the second to the first tiltable reflector. Referring back to FIG. 1 for example, the polarization of the light beam 104 emitted by the light source 106, and the orientation of the first QWP 121 may be selected to cause the light beam 104 to be reflected by the beamsplitter 112 towards the second tiltable reflector 152. In that case, the second QWP 122 may be moved to the location 122* in front of the first tiltable reflector 102. That causes the light beam reflected by the second tiltable reflector 102 to be reflected by the beamsplitter 112 back to the first curved reflector 102, and, after two more passes through the first QWP 121, to be transmitted by the beamsplitter 112 to propagate to the first tiltable reflector 102.

Referring back to FIGS. 2A and 2B, the first 202 and second 252 tiltable reflectors may each include a MEMS tiltable reflector. Each MEMS reflector may be tiltable in one dimension, e.g. one MEMS reflector tiltable up-down and the other MEMS reflector tiltable left-right, or in two dimensions, e.g. both up and down and left-right in FIG. 2, i.e. in-plane and out-of-plane of FIG. 2. This may be useful in some embodiments considered further below. The first 231 and second 232 lenses, as well as the meniscus reflective lenses of the first 214 and second 264 curved reflector, may be optimized to reduce optical aberrations across the entire range of scanning of the tiltable reflector 202. Another lens 265 may be provided on the third QWP 223 to balance focusing and/or aberrations in the system. The propagation of the light beam 204 is further illustrated in FIGS. 2B and 2C, which show that the light source 206 emits a converging light beam propagating through a center opening 215 in the first curved reflector 214.

Figure 2D:
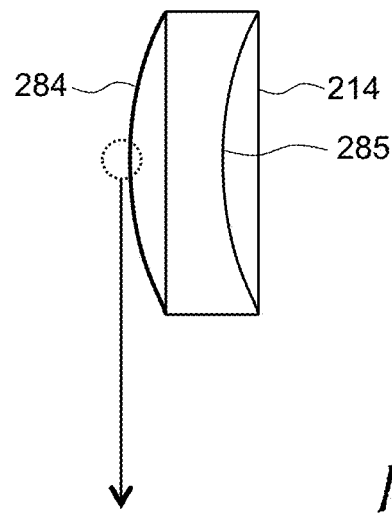
FIG. 2D is a ray-traced cross-sectional view of a curved reflector embodiment with chromatic aberration compensation.
Figure 2D:
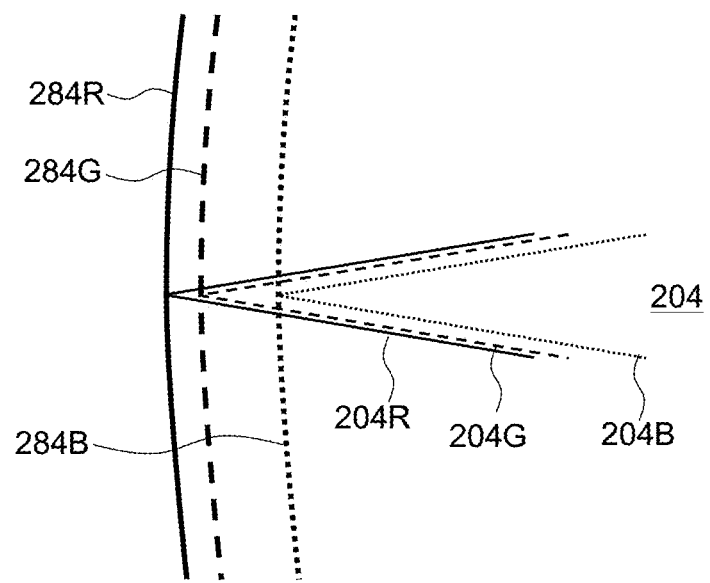

In embodiments where the light beam includes color channel components, e.g. red (R), green (G), and blue (B) color channel components, the first 214 curved reflector may be optimized to lessen the effects of chromatic aberration. Referring to FIG. 2D, the light beam 204 includes a R channel component 204R, a G channel component 204G, and a B channel component 204B. The first curved reflector 214 includes a distal convex reflector surface 284 (top portion of FIG. 2D) and a proximal concave refractive surface 285. Herein, the terms "distal" and "proximal" are with reference to the PBS 212. As illustrated at the bottom portion of FIG. 2D, the convex reflector surface 284 may include a plurality of dichroic coatings each reflecting its own color channel component and optionally transmitting other channel components. For example, a B channel dichroic coating 284B may reflect B channel component while transmitting R and G channel components; a G channel dichroic coating 284G may reflect G channel component while transmitting R channel component; and an R channel coating 284R may reflect the R channel component. The R channel coating 284R may, but does not have to be, dichroic, as it reflects all remaining light. The R, G, and B channel coatings 284R, 284G, and 284B may be disposed at different distances from the proximal concave refractive surface 285 of the first curved reflector 214 to offset or lessen chromatic aberration that may be present in the near-eye display 200. The order of the R, G, and B channel coatings 284R, 284G, and 284B may differ from the one illustrated. Chromatic aberration may be mitigated by other means, as well. For example, the source points of the R, G, and B channel light sources of the light source 206 may be spatially separated along the direction of propagation to pre-compensate for the chromatic effects. In another example, the first lens 231 and/or the second lens 232 may be achromatized, i.e. by using a combination of optical materials with different dispersion properties, as well as diffractive optical elements.

The second curved reflector 264 may be constructed in a similar manner. At least two coatings may be provided for the first 214 and/or second 264 curved reflectors. One of the spaced apart coatings, or both coatings, may be dichroic. Three or more coatings, some of them dichroic, may be provided to better offset the chromatic aberration.

The controller 290 of the near-eye display 200 (FIG. 2A) may be configured to operate the first 202 and second 252 tiltable reflectors to cause the light beam 204 at the exit pupil 210 of the beam-folded pupil relay 208 to have a beam angle corresponding to a particular pixel of an image in angular domain to be displayed by the near-eye display 200. The controller 290 operates the light source 206 in coordination with operating the tiltable reflectors 202 and 252, such that the light beam 204 has brightness, color, etc. corresponding to the pixel(s) being displayed. The entire image in angular domain is formed when the light beam 204 is scanned in two dimensions, e.g. over X- and Y-viewing angles, over the entire frame or field of view (FOV) of the near-eye display 200. When the frame rate is high enough, the eye of the user integrates the scanned light beam 204, enabling the user to see the displayed imagery substantially without flicker.

Figure 3A:
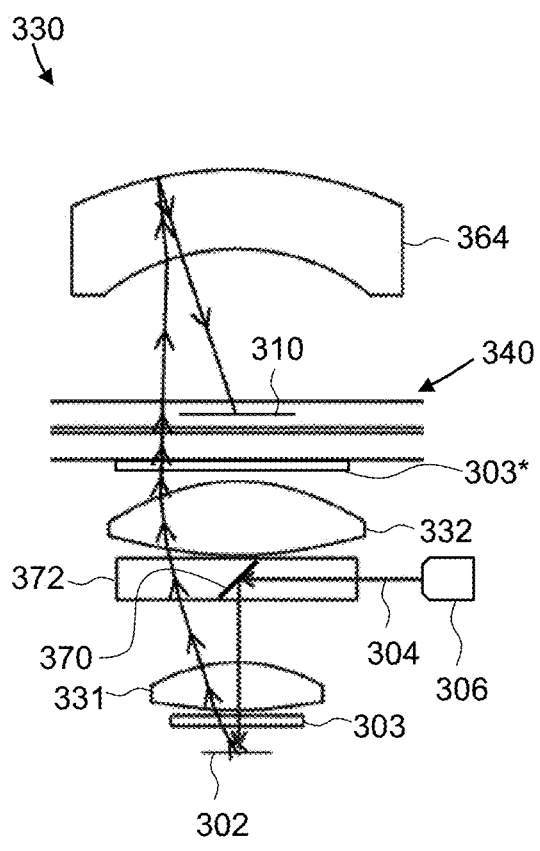
FIG. 3A is a schematic view of a variant of the beam scanner of this disclosure including a buried mirror.
Figure 3B:
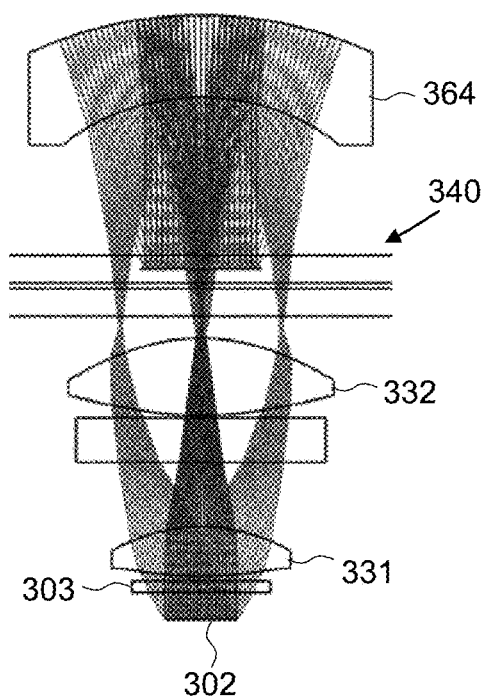
FIG. 3B is a ray-trace diagram of the beam scanner of FIG. 3A.

Referring now to FIGS. 3A and 3B, a beam scanner 330 may utilize a polarization-selective input coupler coupling one polarization of light and transmitting the other, orthogonal polarization of light, e.g. coupling circularly polarized light of one handedness only. The beam scanner 330 includes a 2D tiltable reflector 302, a QWP 303, a buried polarization-selective reflector 370 buried in a transparent slab 372, first 331 and second 332 lenses, and a curved reflector 364. In operation, a linearly polarized light beam 304 from a light source 306 propagates in the transparent slab 372 and is reflected by the buried polarization-selective reflector 370 to impinge onto the tiltable reflector 302 through the first lens 331 and the QWP 303. The first lens 331 collimates the light beam 304. The tiltable reflector 302 reflects the light beam 304 at a variable angle. Upon double propagation through the QWP 303, the light beam changes polarization to an orthogonal linear polarization, and consequently propagates through the buried polarization-selective reflector 370. The first lens 331 focuses the light beam 304 (FIG. 3B) to propagate towards the second lens 332. The second lens 332 relays the light beam 304 to the curved reflector 364 through the waveguide assembly 340, which may include one or more waveguides equipped with a polarization-selective input coupler mentioned above. A QWP 303* may be provided to convert linear polarization of the light beam 304 into a circular polarization, for use with a circular polarization selective coupler. The curved reflector 364 directs the light beam 304 to an exit pupil 310. Upon reflection from the curved reflector 364, the light beam 304 changes the handedness of the circular polarization, and the polarization-selective input coupler(s) of the waveguide assembly 340 may now couple the light beam 304 into the pupil-replicating waveguide(s) of the waveguide assembly 340.

Figure 4A:
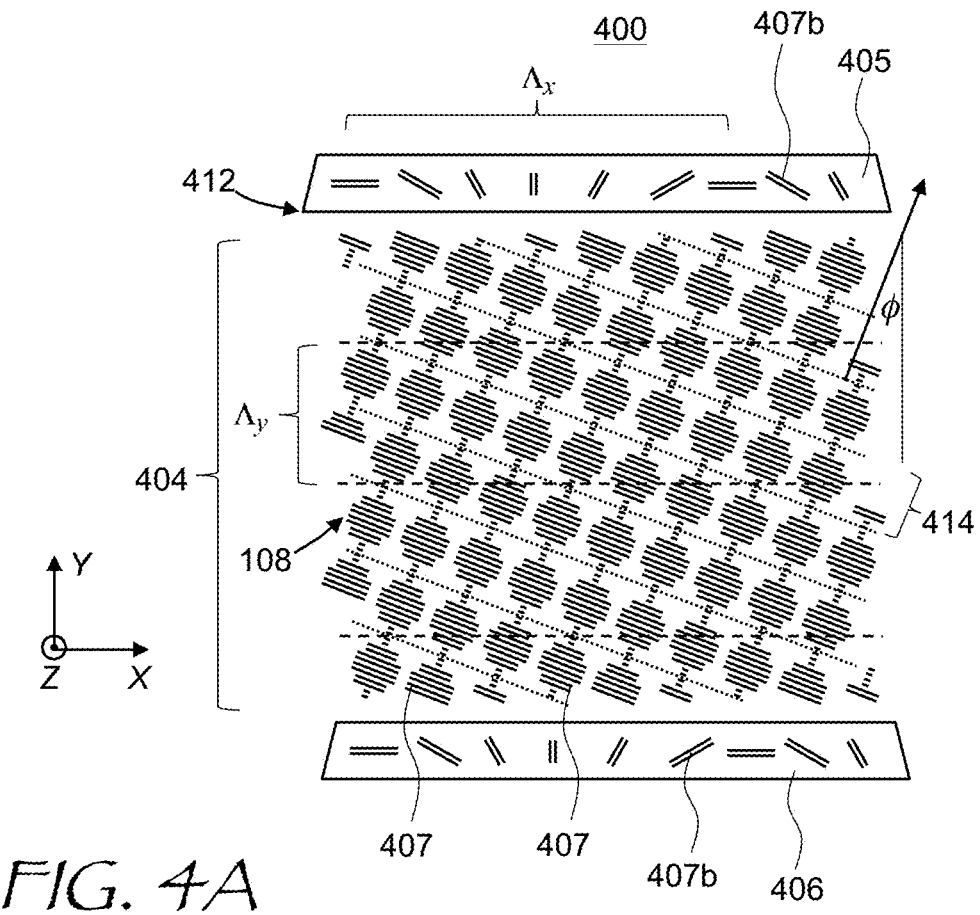
FIG. 4A is a schematic cross-sectional view of a polarization volume hologram (PVH) grating usable in the near-eye displays of FIGS. 2A-2C and FIG. 3.

An exemplary embodiment of the polarization-selective couplers, such as the polarization-selective input grating 260 (FIG. 2A), will now be considered. By way of example, referring to FIG. 4A, a polarization volume hologram (PVH) grating 400 includes an LC layer 404 bound by opposed top 405 and bottom 406 parallel surfaces. The LC layer 404 may include an LC fluid containing rod-like LC molecules 407 with positive dielectric anisotropy, e.g. nematic LC molecules. A chiral dopant may be added to the LC fluid, causing the LC molecules in the LC fluid to self-organize into a periodic helical configuration including helical structures 408 extending between the top 405 and bottom 406 parallel surfaces of the LC layer 404. Such a configuration of the LC molecules 407, termed herein a cholesteric configuration, includes a plurality of helical periods p, e.g. at least two, at least five, at least ten, at least twenty, or at least fifty helical periods p between the top 405 and bottom 406 parallel surfaces of the LC layer 404. Boundary LC molecules 407b at the top surface 405 of the LC layer 404 may be oriented at an angle to the top surface 405. The boundary LC molecules 407b may have a spatially varying azimuthal angle, e.g. linearly varying along X-axis parallel to the top surface 405, as shown in FIG. 4A. To that end, an alignment layer 412 may be provided at the top surface 405 of the LC layer 404. The alignment layer 412 may be configured to provide the desired orientation pattern of the boundary LC molecules 407b, such as the linear dependence of the azimuthal angle on the X-coordinate. A pattern of spatially varying polarization directions of the UV light may be selected to match a desired orientation pattern of the boundary LC molecules 407a at the top surface 405 and/or the bottom surface 406 of the LC layer 404. When the alignment layer 412 is coated with the cholesteric LC fluid, the boundary LC molecules 407a are oriented along the photopolymerized chains of the alignment layer 412, thus adopting the desired surface orientation pattern. Adjacent LC molecules adopt helical patterns extending from the top 405 to the bottom 406 surfaces of the LC layer 404, as shown.

The boundary LC molecules 407b define relative phases of the helical structures 408 having the helical period p. The helical structures 408 form a volume grating comprising helical fringes 414 tilted at an angle φ, as shown in FIG. 4A. The steepness of the tilt angle φ depends on the rate of variation of the azimuthal angle of the boundary LC molecules 407b at the top surface 405 and p. Thus, the tilt angle φ is determined by the surface alignment pattern of the boundary LC molecules 407A at the alignment layer 412. The volume grating has a period $\Lambda_x$ along X-axis and $\Lambda_y$ along Y-axis. In some embodiments, the periodic helical structures 408 of the LC molecules 407 may be polymer-stabilized by mixing in a stabilizing polymer into the LC fluid, and curing (polymerizing) the stabilizing polymer.

Figure 4B:
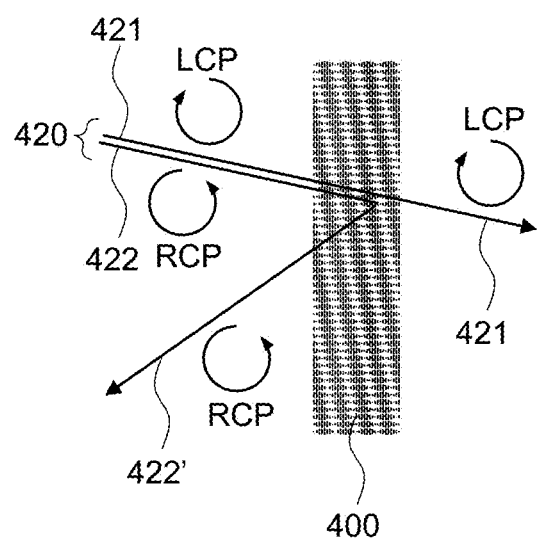
FIG. 4B is a schematic diagram illustrating the principle of operation of the PVH grating of FIG. 4A.

The helical nature of the fringes 414 of the volume grating makes the PVH grating 400 preferably responsive to light of polarization having one particular handedness, e.g. left- or right-circular polarization, while being substantially non-responsive to light of the opposite handedness of polarization. Thus, the helical fringes 414 make the PVH grating 400 polarization-selective, causing the PVH grating 400 to diffract light of only one handedness of circular polarization. This is illustrated in FIG. 4B, which shows a light beam 420 impinging onto the PVH grating 400. The light beam 420 includes a left circular polarized (LCP) beam component 421 and a right circular polarized (RCP) beam component 422. The LCP beam component 421 propagates through the PVH grating 400 substantially without diffraction. Herein, the term "substantially without diffraction" means that, even though an insignificant portion of the beam (the LCP beam component 421 in this case) might diffract, the portion of the diffracted light energy is so small that it does not impact the intended performance of the PVH grating 400. The RCP beam component 422 of the light beam 420 undergoes diffraction, producing a diffracted beam 422'. The polarization selectivity of the PVH grating 400 results from the effective refractive index of the grating being dependent on the relationship between the handedness, or chirality, of the impinging light beam and the handedness, or chirality, of the grating fringes 414. It is further noted that the sensitivity of the PVH 400 to right circular polarized light in particular is only meant as an illustrative example. When handedness of the helical fringes 414 is reversed, the PVH 400 may be made sensitive to left circular polarized light.

Figure 5A:
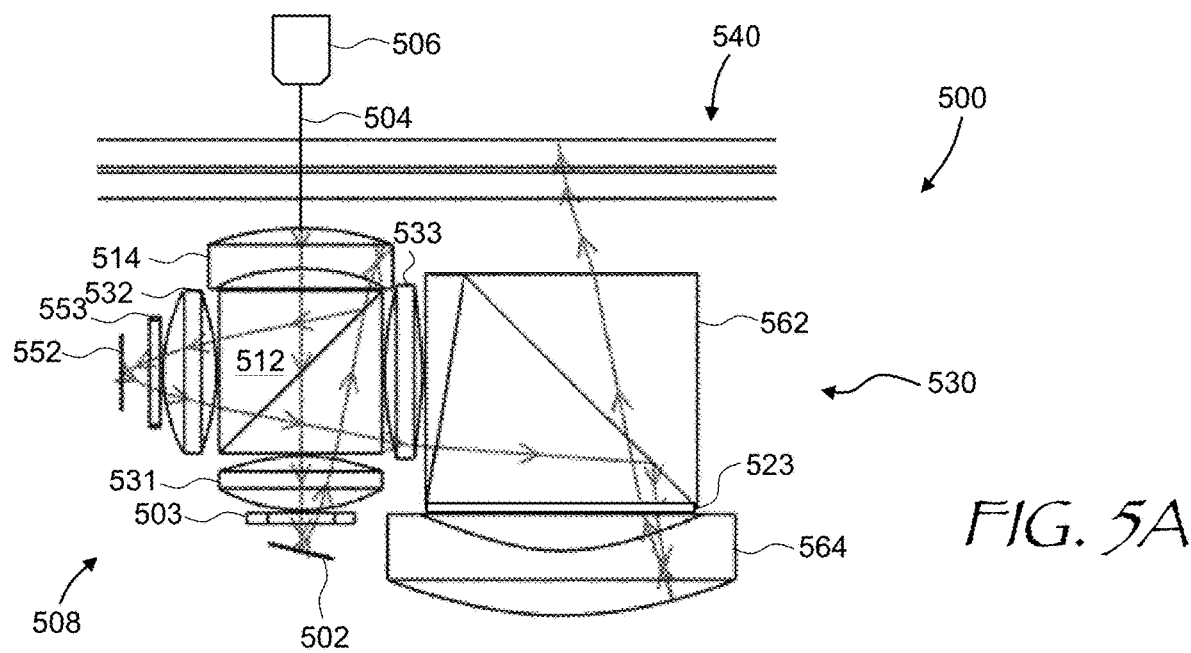
FIGS. 5A and 5B are a schematic view and a raytrace diagram, respectively, of a variant of the beam scanner of this disclosure including a second polarization beamsplitter.
Figure 5B:
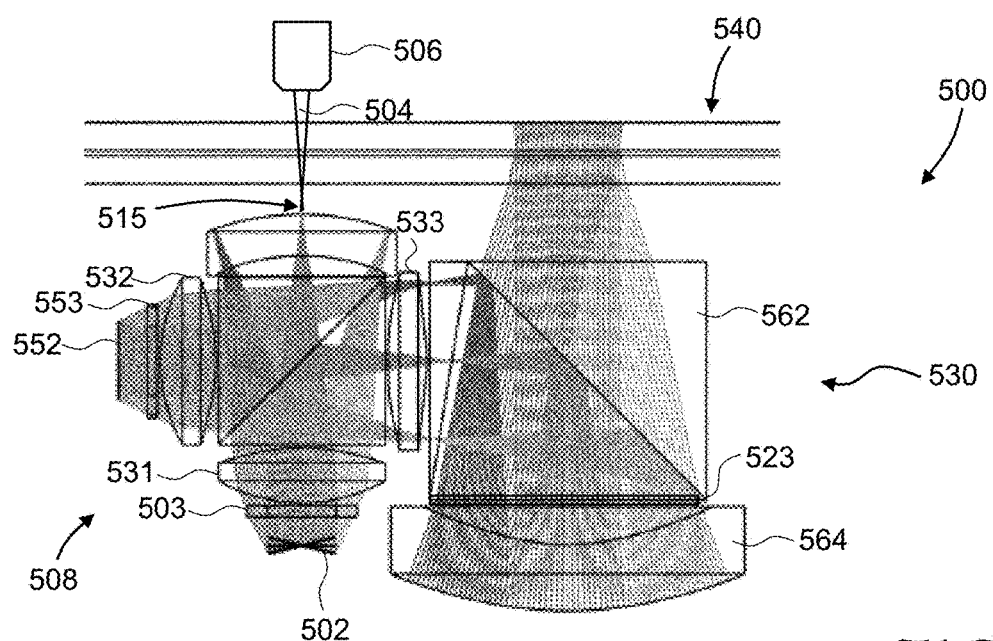

Referring to FIGS. 5A and 5B, a near-eye display 500 includes a pupil-replicating waveguide assembly 540 optically coupled to a beam scanner 530 configured to scan a light beam 504 received from a light source 506. The pupil-replicating waveguide assembly 540 may have one, two, three or more waveguides. Two waveguides, 540-1 and 540-2, are shown as an illustrative example. The beam scanner 530 includes first 502 and second 552 tiltable reflectors, e.g. MEMS reflectors having first 503 and second 553 protective windows, respectively. The first 502 and second 552 tiltable reflectors are optically coupled to each other by a beam-folded pupil relay 508 including a first PBS 512, a first curved reflector 514, and first 531, second 532, and third 533 lenses. The construction and operation of the beam-folded pupil relay 508 is similar to those of the beam-folded pupil relay 108 of FIG. 1 and the beam-folded pupil relay 208 of FIGS. 2A-2C described above. First and second QWPs are not shown in FIGS. 5A and 5B for brevity.

The beam-folded pupil relay 508 (FIGS. 5A and 5B) further includes a second PBS 562, which receives the light beam 504 from the first PBS 512 and reflects the light beam 504 towards a second curved reflector 564. A polarization-flipping QWP 523 changes the polarization state of the light beam 504 after double-pass propagation, causing the reflected light beam 504 to propagate through the second PBS 562 and impinge onto the waveguide assembly 540. Similarly to the beam scanner 130 of FIG. 1 and to the beam scanner 230 of FIGS. 2A-2C, the light beam 504 may propagate through an opening 515 in the first curved reflector 514.

In some embodiments, the light source 506 may be disposed to the left of the second PBS 562 in FIGS. 5A and 5B, i.e. it may be coupled to the second PBS 562. The light source 506 may be configured to emit linearly polarized light, which propagates in sequence through the second PBS 562, the first PBS 512, and impinges onto the second tiltable reflector 552. In some embodiments, the light source 506 may be placed below the second curved reflector 564, which may be equipped with a small opening, not shown, to propagate the light beam 504 therethrough. The light source 506 may be configured to emit circularly polarized light. After propagating through the polarization-flipping QWP 523 it may be reflected in sequence by the second PBS 562, the first PBS 512, and may impinge onto the first tiltable reflector 502.

Figure 6A:
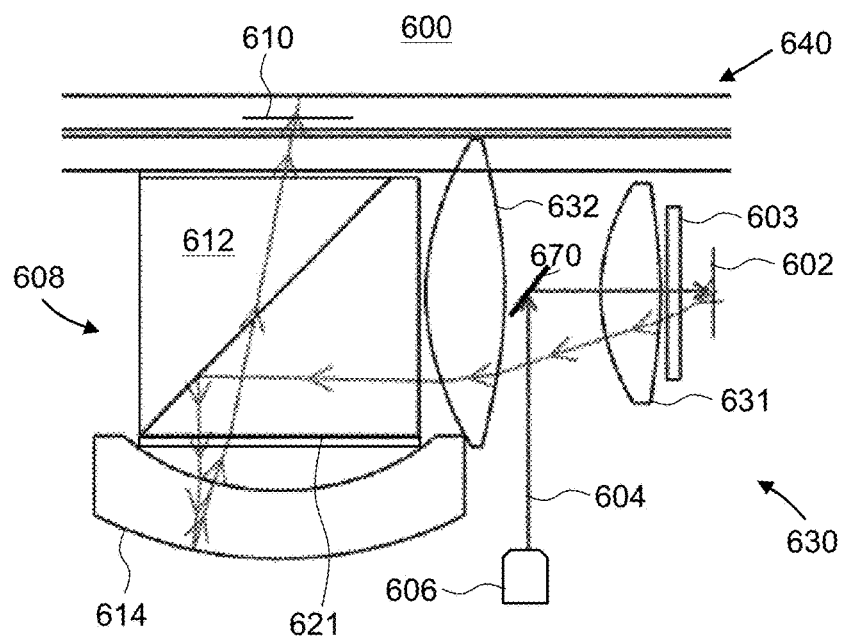
FIGS. 6A and 6B are a schematic view and a raytrace diagram, respectively, of a variant of the beam scanner of this disclosure including a curved reflector, a secondary reflector, and a tiltable reflector.
Figure 6B:
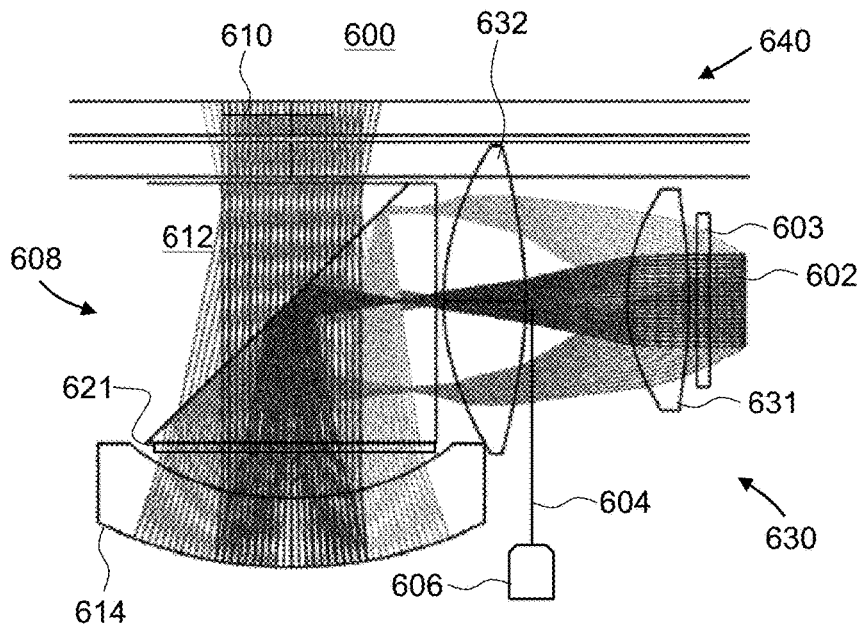

Referring to FIGS. 6A and 6B, a near-eye display 600 includes a pupil-replicating waveguide assembly 640 optically coupled to a beam scanner 630 configured to receive a light beam 604 from a light source 606. The pupil-replicating waveguide assembly 640 may have one, two, three or more waveguides. Two waveguides are shown as an example. The beam scanner 630 includes a 2D tiltable reflector 602, e.g. a MEMS tiltable reflector having a window 603 for hermetic packaging the MEMS tiltable reflector, optically coupled to an exit pupil 610 by a beam-folded pupil relay 608 including a PBS 612, a curved reflector 614, and first 631 and second 632 lenses. The beam-folded pupil relay 608 (FIGS. 6A and 6B) further includes a secondary reflector 670. In operation, the secondary reflector 670 receives the light beam 604 from the light source 606 and reflects the light beam 604 towards the tiltable reflector 602 through the first lens 631, which collimates the light beam 604. The reflected light beam 604 propagates past the secondary reflector 670 (because the light beam 604 is broader than the secondary reflector 670 at that location), propagates through the second lens 632, and is reflected by the PBS 612 towards the curved reflector 614 through a QWP 621. The light beam 604 reflected from the curved reflector 614 propagates through the QWP 621 twice and thus changes its polarization state to an orthogonal polarization state, propagating through the PBS 612 and impinging onto the waveguide assembly 640. In some embodiments, the secondary reflector 670 may be made polarization-selective, and a QWP may be provided in place of the window 603 to flip polarization of the light beam 604 propagated twice through the QWP such that upon a subsequent propagation, the light beam 604 is transmitted through the secondary reflector 670, thereby avoiding the optical losses at the reflector 670. Alternatively, the light source 606 may be placed to the left of the PBS 612 in FIGS. 6A and 6B and be configured to emit the linearly polarized light beam 604 at a linear polarization orientation enabling propagation of the light beam 604 through the PBS 612. Then, upon double-pass propagation through the QWP in place of the window 603, the light beam 604 becomes orthogonally polarized and is reflected by the PBS 612 towards the curved reflector 614. Alternatively, the light source 606 may be disposed under the curved reflector 614. In this embodiment, the light source 606 may be configured to emit circularly polarized light, such that the light beam 604 becomes linearly polarized after propagating through the QWP 621 and is reflected by the PBS 612 towards the tiltable reflector 602.

Figure 7A:
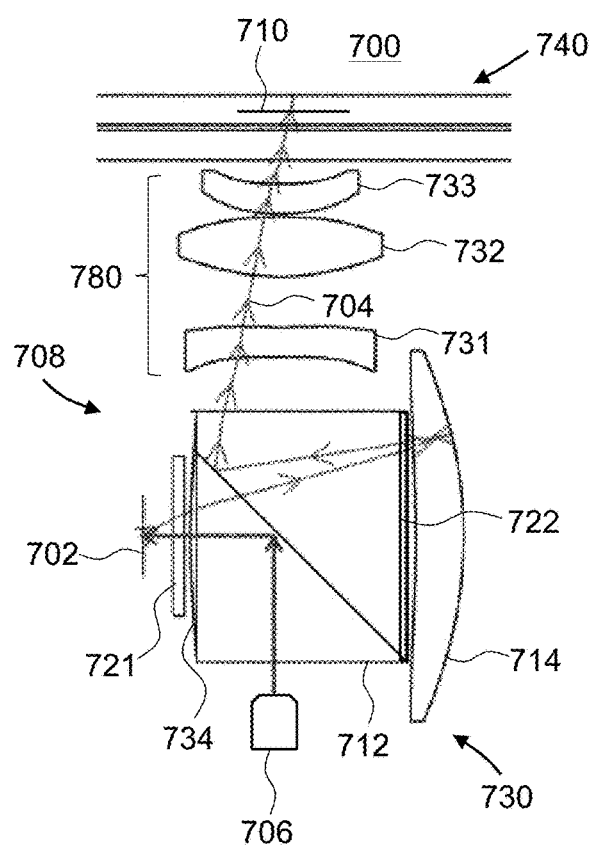
FIGS. 7A and 7B are a schematic view and a raytrace diagram, respectively, of a variant of the beam scanner of this disclosure including a collimating lens assembly.
Figure 7B:
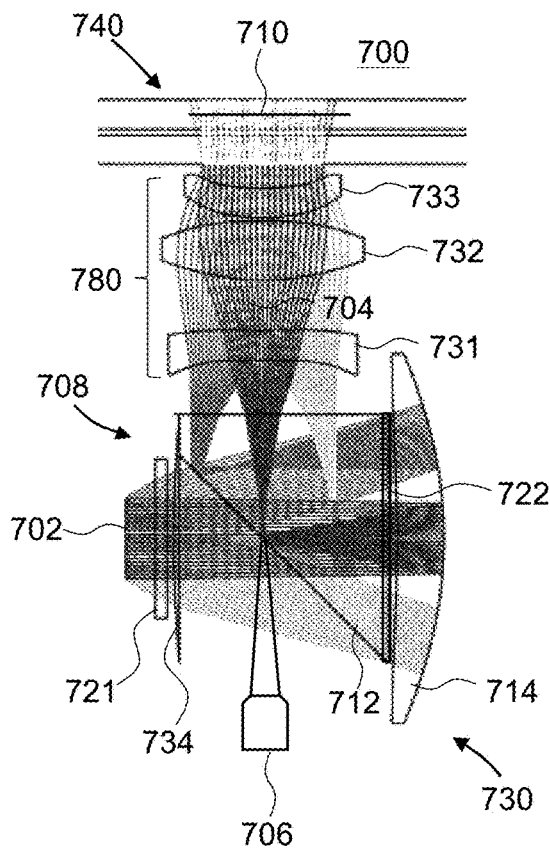

Referring to FIGS. 7A and 7B, a near-eye display 700 includes a pupil-replicating waveguide assembly 740 optically coupled to a beam scanner 730 configured to receive a light beam 704 from a light source 706. The pupil-replicating waveguide assembly 740 may have one, two, three or more waveguides. The beam scanner 730 includes a 2D tiltable reflector 702, e.g. a MEMS tiltable reflector, optically coupled to an exit pupil 710 by a beam-folded pupil relay 708 including a PBS 712, a curved reflector 714, and a lens assembly 780 including first 731, second 732, and third 733 lenses. The beam-folded pupil relay 708 (FIGS. 7A and 7B) further includes first 721 and second 722 QWPs. In operation, the PBS 712 receives the light beam 704 from the light source 706 and reflects the light beam 704 towards the tiltable reflector 702 through the QWP 721 and an optional auxiliary lens 734. The reflected light beam 704 propagates again through the first QWP 621 and the auxiliary lens 734, propagates through the PBS 712 (since its polarization has been flipped by double-pass propagation through the first QWP 721), through the second QWP 722, and impinges onto the curved reflector 714. Upon reflection from the curved reflector 714, the light beam 704 flips the polarization again, is reflected by the PBS 712 towards the lens assembly 780, which collimates the light beam 704 at the waveguide assembly 740.

In some embodiments, the light source 706 may be disposed to the right of the curved reflector 714 in FIGS. 7A and 7B and configured to emit the circularly polarized light bam 704. In operation, the light beam 704 propagates through an opening, not shown, in the curved reflector 714, propagates through the second QWP 722, becomes linearly polarized, and is transmitted through the PBS 712. In this embodiment, the first QWP 721 may be omitted to enable the light beam 704 reflected by the tiltable reflector 702 to propagate again through the PBS 712 towards the curved reflector 714.

Figure 8A:
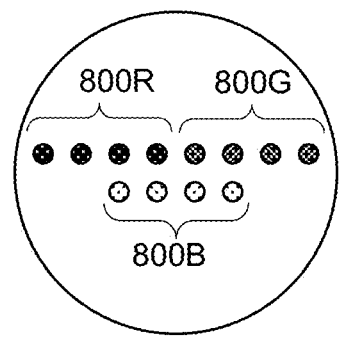
FIGS. 8A, 8B, and 8C are frontal views of multi-emitter light sources usable in near-eye displays disclosed herein.
Figure 8B:
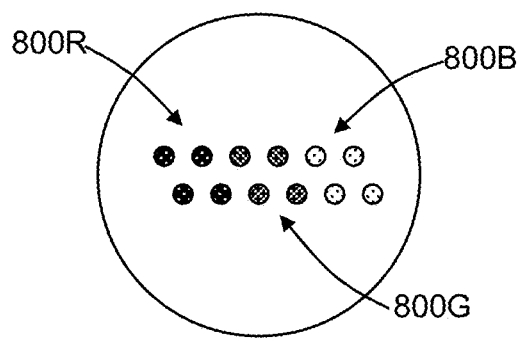
Figure 8C:
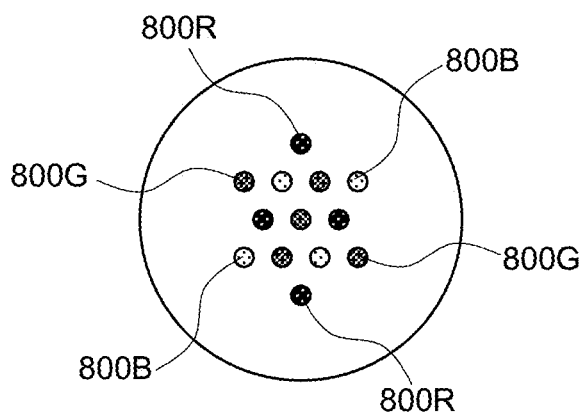

The light sources 106 of FIG. 1, 206 of FIGS. 2A and 2B, 306 of FIG. 3, 506 of FIGS. 5A and 5B, 606 of FIGS. 6A and 6B, and 706 of FIGS. 7A and 7B may each include a plurality of individually controllable emitters, e.g. superluminescent light-emitting diodes (SLEDs). Several emitters may be provided for each color channel. Referring to FIGS. 8A, 8B, and 8C, four red emitters 800R may be provided for red (R) color channel (dark-shaded circles); four green emitters 800G may be provided for green (G) color channel (medium-shaded circles); and four blue emitters 800B may be provided for blue (B) color channel (light-shaded circles). The emitters 800R, 800G, and 800B may each be ridge emitters sharing a common semiconductor substrate. The emitters 800R, 800G, and 800B may be disposed in a line pattern (FIG. 8A); in a zigzag pattern (FIG. 8B); or in a honeycomb pattern (FIG. 8C), to name just a few examples.

Having a plurality of emitters illuminating a same tiltable reflector enables the scanning of the light beams generated by the emitters to be performed together as a group. When a light source includes a plurality of individual emitters, the illuminating light beam includes a plurality of sub-beams co-propagating at a slight angle w.r.t each other. Maximum angular cone of the sub-beams may be less than 5 degrees, or less than 2 degrees, or less than 1 degree in some embodiments. Multiple emitters and, in some cases, multiple light sources may be used to provide redundancy in case some of light sources fail, increase image resolution, increase overall image brightness, etc. Multiple light sources may each be equipped with its own collimator.

Figure 9A:
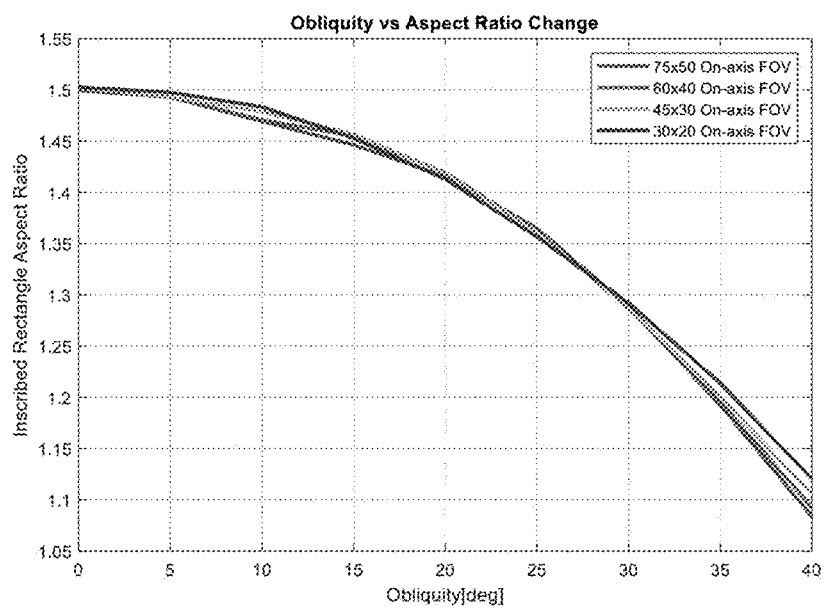
FIG. 9A is a graph of aspect ratio of a field of view (FOV) of a scanning projector display as a function of beam obliquity.
Figure 9B:
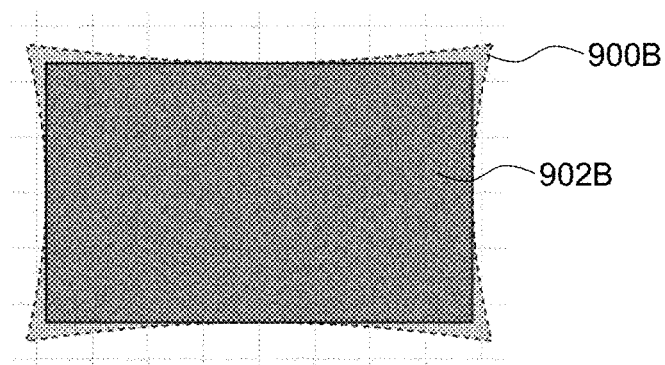
FIG. 9B is a schematic view of a FOV at zero obliquity in FIG. 9A.
Figure 9C:
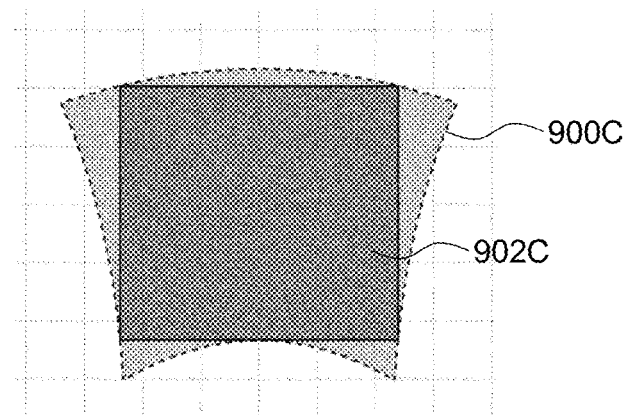
FIG. 9C is a schematic view of a FOV at maximum obliquity in FIG. 9A.

The near-eye displays 200 of FIG. 2, 300 of FIGS. 3A-3C, 500 of FIGS. 5A and 5B, 600 of FIGS. 6A and 6B, and 700 of FIGS. 7A and 7B provide a low-obliquity coupling of light beam(s) to a tiltable reflector. Herein, the term "low obliquity" means a low angle of incidence, i.e. a normal incidence, at the tiltable reflector when in a nominal, e.g. a center or zero, angle of tilt. One advantage of having low obliquity is illustrated in FIGS. 9A to 9C. Referring first to FIG. 9A, an aspect ratio of a FOV of a projector using a tiltable reflector is plotted as a function of obliquity, i.e. angle of incidence at the tiltable reflector when in nominal or center position. The aspect ratio is plotted for four cases: 75 degrees by 50 degrees on-axis FOV; 60 degrees by 40 degrees on-axis FOV; 45 degrees by 30 degrees on-axis FOV; and 30 degrees by 20 degrees on-axis FOV. The aspect ratio drops from 1.5 at zero obliquity, i.e. normal incidence, to about 1.1 at 40 degrees obliquity angle.

FIG. 9B shows a zero-obliquity scanning angular area 900B and an associated inscribed rectangular FOV 902B. The zero-obliquity FOV 902B solid angle is covering most of the angular area 900B. By comparison, FIG. 9C shows a 40 degrees obliquity scanning angular area 900C and an associated inscribed rectangular FOV 902C. The FOV 902C solid angle occupies a smaller percentage of the angular area 900C, and is almost 2 times less than the zero-obliquity FOV 902B, and has a different aspect ratio. Thus, the low-obliquity coupling improves the utilization of the scanning range of the tiltable reflector, enabling wider fields of view at the same scanning range of the tiltable reflector.

Figure 10:
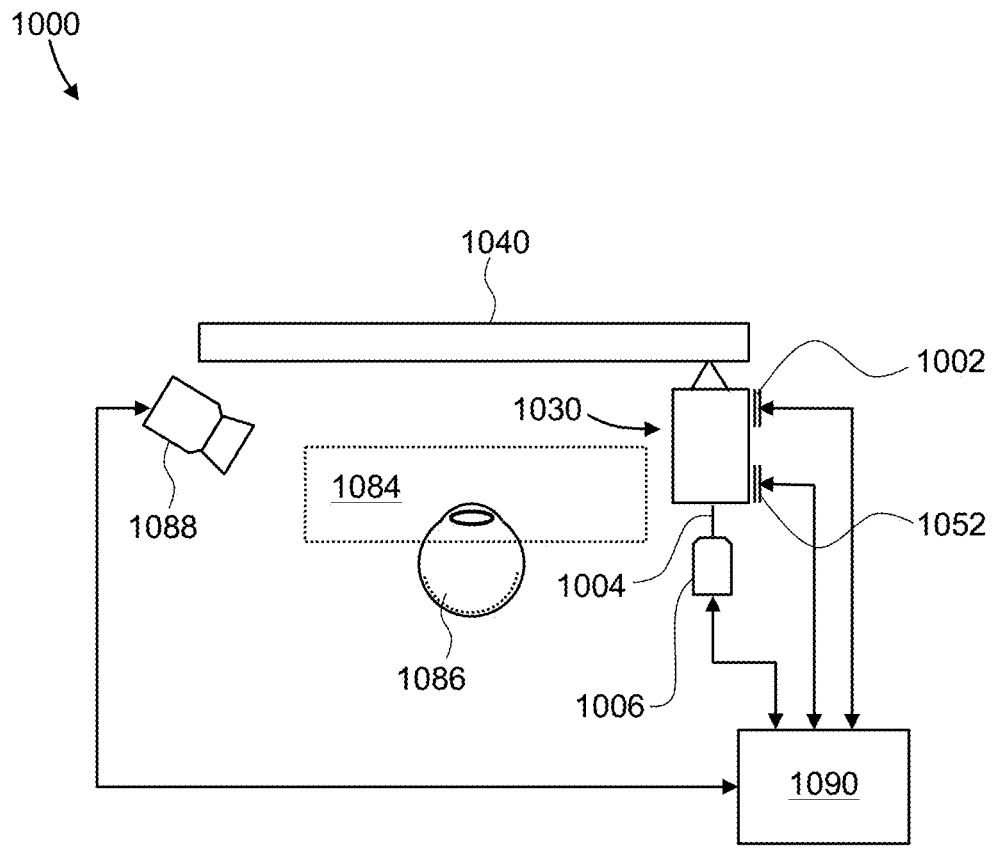
FIG. 10 is a block diagram of a near-eye display with a floating FOV.

Turning to FIG. 10, a near-eye display 1000 includes a light source 1006, a beam scanner 1030 coupled to the light source 1006, and a pupil-replicating waveguide assembly 1040 coupled to the beam scanner 1030. The beam scanner 1030 may include any of the beam scanners described herein, e.g. the beam scanner 130 of FIG. 1, the beam scanner 230 of FIGS. 2A-2C, the beam scanner 330 of FIG. 3, the beam scanner 530 of FIG. 5, the beam scanner 630 of FIGS. 6A and 6B, and/or the beam scanner 730 of FIGS. 7A and 7B. In the embodiment shown, the beam scanner 1030 includes first 1002 and second 1052 tiltable reflectors, e.g. MEMS reflectors tiltable about one or two axes. A controller 1090 is operably coupled to the light source 1006, the first 1002 and second 1052 tiltable reflectors, and to an optional eye tracker 1088. The function of the eye tracker 1088 is to determine at least one of position or orientation of a user's eye 1086 in an eyebox 1084, from which a gaze direction of the user may be determined in real time.

In operation, the controller 1090 operates the first 1002 and second 1052 tiltable reflectors to cause a light beam 1004 at the exit pupil of the beam-folded pupil relay to have a beam angle corresponding to a pixel of an image to be displayed. The light source 1006 is operated by the controller 1090 in coordination with scanning the light beam 1004 to form an image in angular domain for displaying to the user. The pupil-replicating waveguide assembly 1040 ensures that the image may be observed by the user's eye 1086 at any position of the user's eye 1086 in the eyebox 1084. In some embodiments, the eye tracker 1088 is operated to determine the gaze direction of the user.

In embodiments where each tiltable reflector 1002 and 1052 is a 2D tiltable reflector, one of them, e.g. the first tiltable reflector 1002, may be operated to scan the light beam 1004 in two non-parallel directions to form the image in angular domain while the other, i.e. the second tiltable reflector 1052 is operated to shift the entire image, i.e. to shift a field of view (FOV) of the near-eye display 1000 towards the gaze direction of the user. The image being rendered by the controller 1090 may be updated accordingly, i.e. shifted in opposite direction by the same amount, to make sure that the virtual image is steady as the FOV is shifted. The resulting effect of "floating" FOV is similar to viewing a dark scenery by using a flashlight, where the flashlight is automatically turned in a direction of user's gaze, illuminating different parts of a surrounding scenery depending where the user is looking at the moment. As the rate of FOV shift is determined by the eye mobility which is generally slower than speed of scanning, the first tiltable reflector 1002 may be made smaller and faster, while the second tiltable reflector 1052 may be made larger and slower.

Figure 11A:
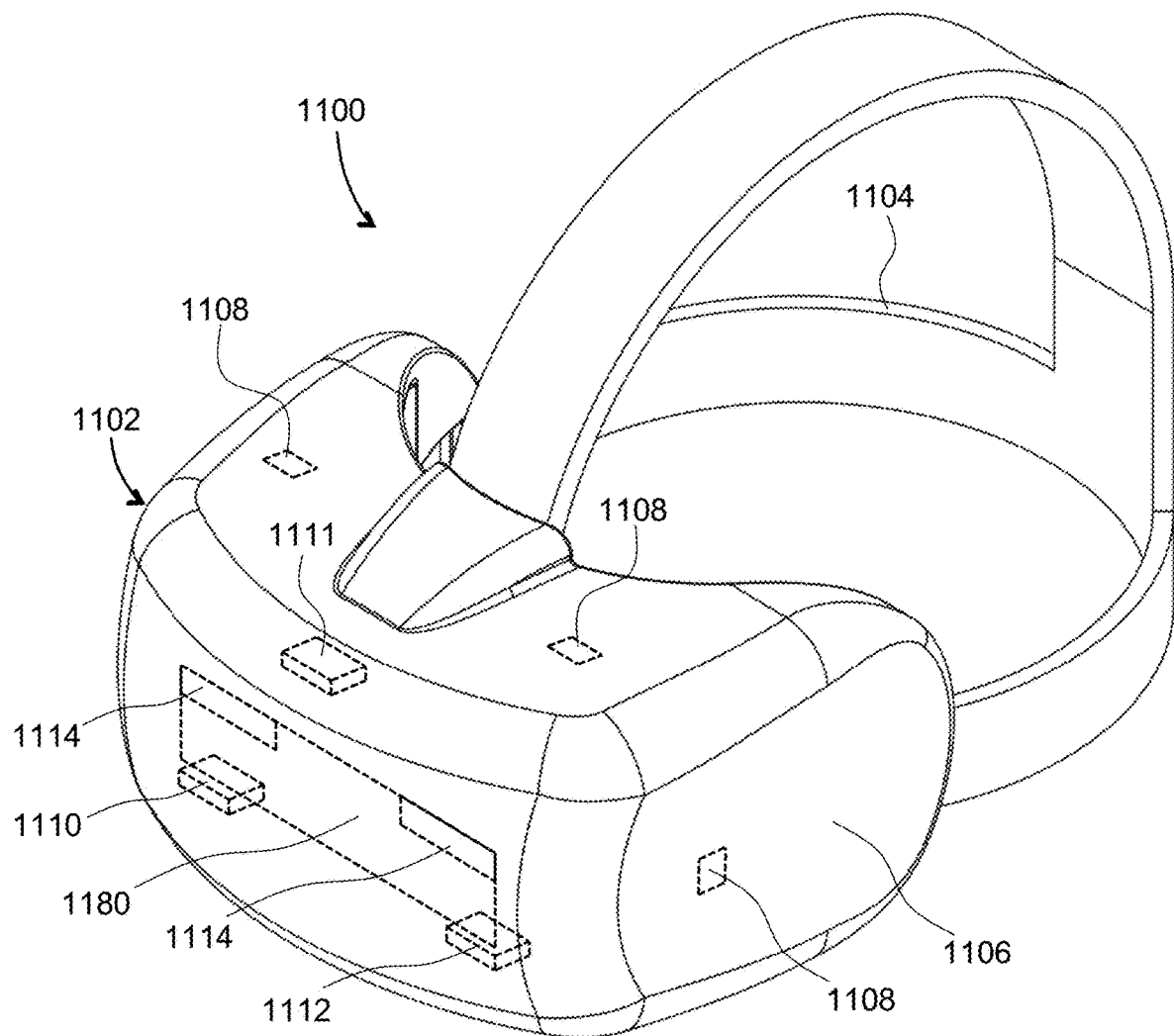
FIG. 11A is an isometric view of a head-mounted display of the present disclosure.

Referring to FIG. 11A, an HMD 1100 is an example of an AR/VR wearable display system which encloses the user's face, for a greater degree of immersion into the AR/VR environment. The HMD 1100 is an embodiment of any of the near-eye displays disclosed herein. The function of the HMD 1100 is to augment views of a physical, real-world environment with computer-generated imagery, and/or to generate the entirely virtual 3D imagery. The HMD 1100 may include a front body 1102 and a band 1104. The front body 1102 is configured for placement in front of eyes of a user in a reliable and comfortable manner, and the band 1104 may be stretched to secure the front body 1102 on the user's head. A display system 1180 may be disposed in the front body 1102 for presenting AR/VR imagery to the user. Sides 1106 of the front body 1102 may be opaque or transparent.

In some embodiments, the front body 1102 includes locators 1108 and an inertial measurement unit (IMU) 1110 for tracking acceleration of the HMD 1100, and position sensors 1112 for tracking position of the HMD 1100. The IMU 1110 is an electronic device that generates data indicating a position of the HMD 1100 based on measurement signals received from one or more of position sensors 1112, which generate one or more measurement signals in response to motion of the HMD 1100. Examples of position sensors 1112 include: one or more accelerometers, one or more gyroscopes, one or more magnetometers, another suitable type of sensor that detects motion, a type of sensor used for error correction of the IMU 1110, or some combination thereof. The position sensors 1112 may be located external to the IMU 1110, internal to the IMU 1110, or some combination thereof.

The locators 1108 are traced by an external imaging device of a virtual reality system, such that the virtual reality system can track the location and orientation of the entire HMD 1100. Information generated by the IMU 1110 and the position sensors 1112 may be compared with the position and orientation obtained by tracking the locators 1108, for improved tracking accuracy of position and orientation of the HMD 1100. Accurate position and orientation is important for presenting appropriate virtual scenery to the user as the latter moves and turns in 3D space.

The HMD 1100 may further include a depth camera assembly (DCA) 1111, which captures data describing depth information of a local area surrounding some or all of the HMD 1100. To that end, the DCA 1111 may include a laser radar (LIDAR), or a similar device. The depth information may be compared with the information from the IMU 1110, for better accuracy of determination of position and orientation of the HMD 1100 in 3D space.

The HMD 1100 may further include an eye tracking system 1114 for determining orientation and position of user's eyes in real time. The obtained position and orientation of the eyes also allows the HMD 1100 to determine the gaze direction of the user and to adjust the image generated by the display system 1180 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1102.

Figure 11B:
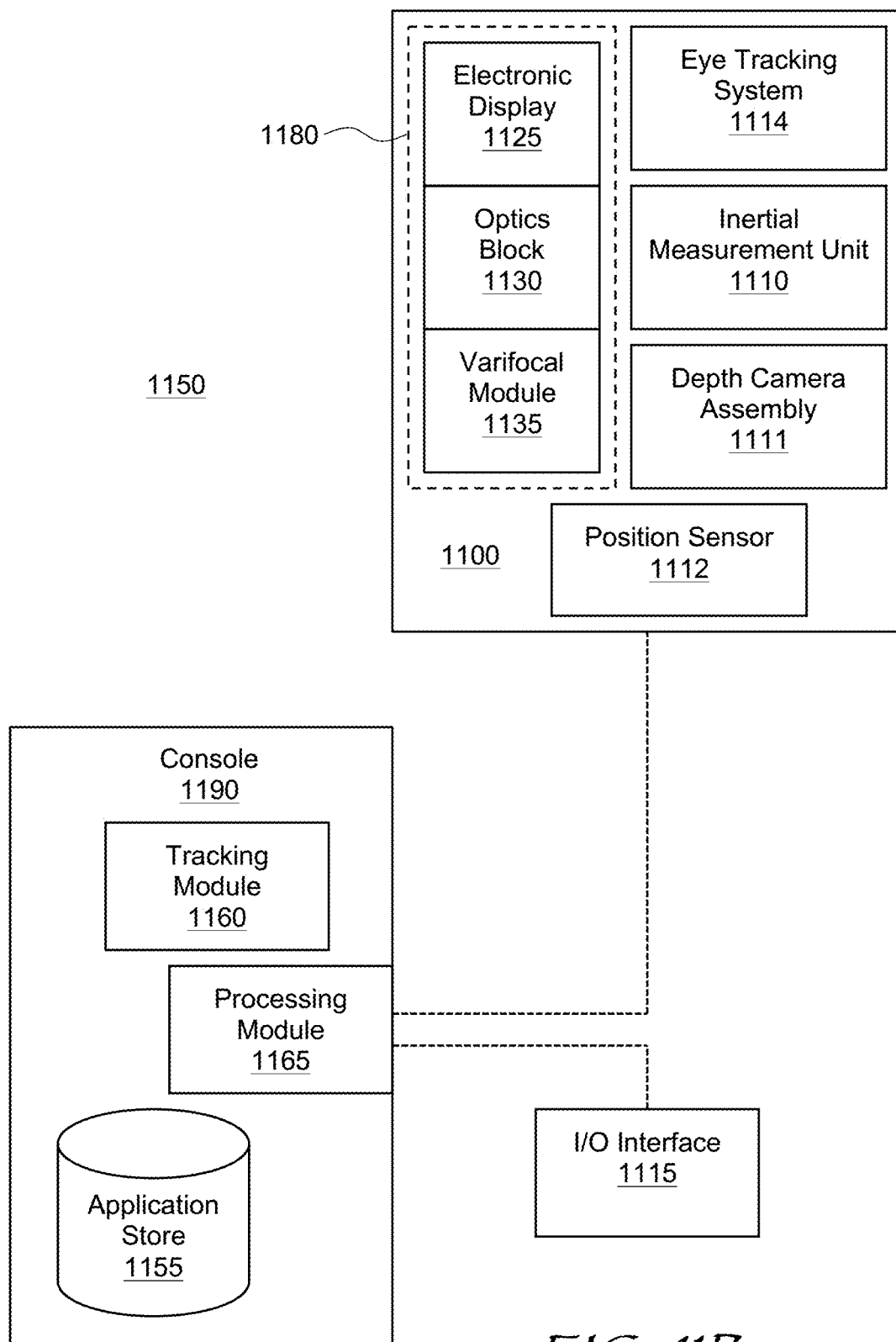
FIG. 11B is a block diagram of a virtual reality system including the headset of FIG. 11A.

Turning to FIG. 11B, an AR/VR system 1150 is an example implementation of a wearable display system. The AR/VR system 1150 includes the HMD 1100 of FIG. 11A, an external console 1190 storing various AR/VR applications, setup and calibration procedures, 3D videos, etc., and an input/output (I/O) interface 1115 for operating the console 1190 and/or interacting with the AR/VR environment. The HMD 1100 may be "tethered" to the console 1190 with a physical cable, or connected to the console 1190 via a wireless communication link such as Bluetooth®, Wi-Fi, etc. There may be multiple HMDs 1100, each having an associated I/O interface 1115, with each HMD 1100 and I/O interface(s) 1115 communicating with the console 1190. In alternative configurations, different and/or additional components may be included in the AR/VR system 1150. Additionally, functionality described in conjunction with one or more of the components shown in FIGS. 11A and 11B may be distributed among the components in a different manner than described in conjunction with FIGS. 11A and 11B in some embodiments. For example, some or all of the functionality of the console 1115 may be provided by the HMD 1100, and vice versa. The HMD 1100 may be provided with a processing module capable of achieving such functionality.

As described above with reference to FIG. 11A, the HMD 1100 may include the eye tracking system 1114 (FIG. 11B) for tracking eye position and orientation, determining gaze angle and convergence angle, etc., the IMU 1110 for determining position and orientation of the HMD 1100 in 3D space, the DCA 1111 for capturing the outside environment, the position sensor 1112 for independently determining the position of the HMD 1100, and the display system 1180 for displaying AR/VR content to the user. The display system 1180 includes (FIG. 11B) an electronic display 1125, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 1180 further includes an optics block 1130, whose function is to convey the images generated by the electronic display 1125 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1180 may further include a varifocal module 1135, which may be a part of the optics block 1130. The function of the varifocal module 1135 is to adjust the focus of the optics block 1130 e.g. to compensate for vergence-accommodation conflict, to correct for vision defects of a particular user, to offset aberrations of the optics block 1130, etc.

The I/O interface 1115 is a device that allows a user to send action requests and receive responses from the console 1190. An action request is a request to perform a particular action. For example, an action request may be an instruction to start or end capture of image or video data or an instruction to perform a particular action within an application. The I/O interface 1115 may include one or more input devices, such as a keyboard, a mouse, a game controller, or any other suitable device for receiving action requests and communicating the action requests to the console 1190. An action request received by the I/O interface 1115 is communicated to the console 1190, which performs an action corresponding to the action request. In some embodiments, the I/O interface 1115 includes an IMU that captures calibration data indicating an estimated position of the I/O interface 1115 relative to an initial position of the I/O interface 1115. In some embodiments, the I/O interface 1115 may provide haptic feedback to the user in accordance with instructions received from the console 1190. For example, haptic feedback can be provided when an action request is received, or the console 1190 communicates instructions to the I/O interface 1115 causing the I/O interface 1115 to generate haptic feedback when the console 1190 performs an action.

The console 1190 may provide content to the HMD 1100 for processing in accordance with information received from one or more of: the IMU 1110, the DCA 1111, the eye tracking system 1114, and the I/O interface 1115. In the example shown in FIG. 11B, the console 1190 includes an application store 1155, a tracking module 1160, and a processing module 1165. Some embodiments of the console 1190 may have different modules or components than those described in conjunction with FIG. 11B. Similarly, the functions further described below may be distributed among components of the console 1190 in a different manner than described in conjunction with FIGS. 11A and 11B.

The application store 1155 may store one or more applications for execution by the console 1190. An application is a group of instructions that, when executed by a processor, generates content for presentation to the user. Content generated by an application may be in response to inputs received from the user via movement of the HMD 1100 or the I/O interface 1115. Examples of applications include: gaming applications, presentation and conferencing applications, video playback applications, or other suitable applications.

The tracking module 1160 may calibrate the AR/VR system 1150 using one or more calibration parameters and may adjust one or more calibration parameters to reduce error in determination of the position of the HMD 1100 or the I/O interface 1115. Calibration performed by the tracking module 1160 also accounts for information received from the IMU 1110 in the HMD 1100 and/or an IMU included in the I/O interface 1115, if any. Additionally, if tracking of the HMD 1100 is lost, the tracking module 1160 may re-calibrate some or all of the AR/VR system 1150.

The tracking module 1160 may track movements of the HMD 1100 or of the I/O interface 1115, the IMU 1110, or some combination thereof. For example, the tracking module 1160 may determine a position of a reference point of the HMD 1100 in a mapping of a local area based on information from the HMD 1100. The tracking module 1160 may also determine positions of the reference point of the HMD 1100 or a reference point of the I/O interface 1115 using data indicating a position of the HMD 1100 from the IMU 1110 or using data indicating a position of the I/O interface 1115 from an IMU included in the I/O interface 1115, respectively. Furthermore, in some embodiments, the tracking module 1160 may use portions of data indicating a position or the HMD 1100 from the IMU 1110 as well as representations of the local area from the DCA 1111 to predict a future location of the HMD 1100. The tracking module 1160 provides the estimated or predicted future position of the HMD 1100 or the I/O interface 1115 to the processing module 1165.

The processing module 1165 may generate a 3D mapping of the area surrounding some or all of the HMD 1100 ("local area") based on information received from the HMD 1100. In some embodiments, the processing module 1165 determines depth information for the 3D mapping of the local area based on information received from the DCA 1111 that is relevant for techniques used in computing depth. In various embodiments, the processing module 1165 may use the depth information to update a model of the local area and generate content based in part on the updated model.

The processing module 1165 executes applications within the AR/VR system 1150 and receives position information, acceleration information, velocity information, predicted future positions, or some combination thereof, of the HMD 1100 from the tracking module 1160. Based on the received information, the processing module 1165 determines content to provide to the HMD 1100 for presentation to the user. For example, if the received information indicates that the user has looked to the left, the processing module 1165 generates content for the HMD 1100 that mirrors the user's movement in a virtual environment or in an environment augmenting the local area with additional content. Additionally, the processing module 1165 performs an action within an application executing on the console 1190 in response to an action request received from the I/O interface 1115 and provides feedback to the user that the action was performed. The provided feedback may be visual or audible feedback via the HMD 1100 or haptic feedback via the I/O interface 1115.

In some embodiments, based on the eye tracking information (e.g., orientation of the user's eyes) received from the eye tracking system 1114, the processing module 1165 determines resolution of the content provided to the HMD 1100 for presentation to the user on the electronic display 1125. The processing module 1165 may provide the content to the HMD 1100 having a maximum pixel resolution on the electronic display 1125 in a foveal region of the user's gaze. The processing module 1165 may provide a lower pixel resolution in other regions of the electronic display 1125, thus lessening power consumption of the AR/VR system 1150 and saving computing resources of the console 1190 without compromising a visual experience of the user. In some embodiments, the processing module 1165 can further use the eye tracking information to adjust where objects are displayed on the electronic display 1125 to prevent vergence-accommodation conflict and/or to offset optical distortions and aberrations.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A beam scanner comprising:
   a first tiltable reflector for reflecting a light beam at a variable angle in a first plane;
   a second tiltable reflector for reflecting the light beam at a variable angle in a second plane;
   a beam-folded pupil relay for receiving the light beam from the first tiltable reflector and relaying the light beam to the second tiltable reflector, the beam-folded pupil relay comprising:
   a beamsplitter for receiving the light beam reflected by the first tiltable reflector; and
   a first curved reflector for receiving the light beam from the beamsplitter, and for reflecting the light beam back towards the beamsplitter, wherein the beamsplitter is configured to:
   couple the light beam reflected by the first curved reflector to the second tiltable reflector; and
   out-couple the light beam reflected by the second tiltable reflector.

2. The beam scanner of claim 1, wherein the first curved reflector has a radius of curvature substantially equal to an optical path length from the first tiltable reflector to the first curved reflector, and to an optical path length from the second tiltable reflector to the first curved reflector.

3. The beam scanner of claim 1, wherein the beamsplitter comprises a polarization beamsplitter (PBS) configured to reflect light having a first polarization state and to transmit light having a second polarization state orthogonal to the first polarization state, the beam scanner further comprising:
   a first quarter-wave waveplate (QWP) disposed in an optical path between the PBS and the first curved reflector and configured to convert polarization of the light beam upon double pass through the first QWP between the first and second polarization states; and
   a second QWP disposed in an optical path between the PBS and the second tiltable reflector and configured to convert polarization of the light beam upon double pass through the second QWP between the first and second polarization states.

4. The beam scanner of claim 3, further comprising:
a second curved reflector configured to:
receive the light beam from the beamsplitter after reflection from the first and second tiltable reflectors; and
reflect the light beam to an exit pupil of the beam scanner; and
a third QWP disposed in an optical path between the beamsplitter and the second curved reflector and configured to convert polarization of the light beam propagated therethrough to a circular polarization.

5. The beam scanner of claim 4, wherein the first curved reflector and the first tiltable reflector are disposed on opposite sides of the beamsplitter, and wherein the second curved reflector and the second tiltable reflector are disposed on opposite sides of the beamsplitter.

6. The beam scanner of claim 4, further comprising:
a first lens in an optical path between the first tiltable reflector and the PBS, for collimating the light beam impinging onto the first tiltable reflector; and
a second lens in an optical path between the second tiltable reflector and the PBS, for collimating the light beam impinging onto the second tiltable reflector.

7. The beam scanner of claim 4, wherein the first and second curved reflectors each comprise a meniscus lens having a proximal concave surface and a distal convex surface, and a reflective coating at the distal convex surface.

8. The beam scanner of claim 7, wherein the light beam comprises first and second color channel components, and wherein the reflective coating of at least one of the first or second curved reflectors includes a first dichroic coating for reflecting the first color channel component and a second coating for reflecting the second color channel component, wherein the first dichroic coating and the second coating are disposed at different distances from the proximal concave surface of the meniscus lens.

9. The beam scanner of claim 1, wherein the first and second tiltable reflectors each comprise a tiltable microelectromechanical system (MEMS) reflector.

10. A projector comprising:
a light source for providing a light beam; and
a beam scanner coupled to the light source for receiving the light beam, the beam scanner comprising:
a first tiltable reflector for reflecting the light beam at a variable angle in a first plane;
a second tiltable reflector for reflecting the light beam at a variable angle in a second plane;
a beam-folded pupil relay for receiving the light beam from the first tiltable reflector and relaying the light beam to the second tiltable reflector, the beam-folded pupil relay comprising:
a beamsplitter for receiving the light beam reflected by the first tiltable reflector; and
a first curved reflector for receiving the light beam from the beamsplitter, and for reflecting the light beam back towards the beamsplitter, wherein the beam-folded pupil relay beamsplitter is configured to:
couple the light beam reflected by the first curved reflector to the second tiltable reflector; and
out-couple the light beam reflected by the second tiltable reflector.

11. The projector of claim 10, wherein the beamsplitter comprises a polarization beamsplitter (PBS) configured to reflect light having a first polarization state and to transmit light having a second polarization state orthogonal to the first polarization state, the beam scanner further comprising:
a first quarter-wave waveplate (QWP) disposed in an optical path between the PBS and the first curved reflector and configured to convert polarization of the light beam upon double pass through the first QWP between the first and second polarization states; and
a second QWP disposed in an optical path between the PBS and the second tiltable reflector and configured to convert polarization of the light beam upon double pass through the second QWP between the first and second polarization states.

12. The projector of claim 11, wherein the beam scanner further comprises:
a second curved reflector configured to:
receive the light beam from the beamsplitter after reflection from the first and second tiltable reflectors; and
reflect the light beam to an exit pupil of the beam scanner; and
a third QWP disposed in an optical path between the beamsplitter and the second curved reflector and configured to convert polarization of the light beam propagated therethrough to a circular polarization.

13. The projector of claim 12, wherein:
the first curved reflector and the first tiltable reflector are disposed on opposite sides of the beamsplitter;
the second curved reflector and the second tiltable reflector are disposed on opposite sides of the beamsplitter; and
the first curved reflector comprises an opening for coupling the light beam from the light source to the beamsplitter.

14. The projector of claim 13, wherein the beam scanner further comprises:
a first lens in an optical path between the first tiltable reflector and the PBS, for collimating the light beam impinging onto the first tiltable reflector; and
a second lens in an optical path between the second tiltable reflector and the PBS, for collimating the light beam impinging onto the second tiltable reflector.

15. A near-eye display for providing an image in angular domain to an eyebox of the near-eye display, the near-eye display comprising:
a light source for providing a light beam;
a beam scanner coupled to the light source for receiving the light beam, the beam scanner comprising:
a first tiltable reflector for reflecting the light beam at a variable angle in a first plane;
a second tiltable reflector for reflecting the light beam at a variable angle in a second plane;
a beam-folded pupil relay for receiving the light beam from the first tiltable reflector and relaying the light beam to the second tiltable reflector, the beam-folded pupil relay comprising:
a beamsplitter for receiving the light beam reflected by the first tiltable reflector;
a first curved reflector for receiving the light beam from the beamsplitter, and for reflecting the light beam back towards the beamsplitter, wherein the beam-folded pupil relay is configured to couple the light beam reflected by the first curved reflector to the second tiltable reflector; and
a second curved reflector configured to receive the light beam from the beamsplitter after reflection from the first and second tiltable reflectors, and to reflect the light beam to an exit pupil of the beam scanner; and
a pupil-replicating waveguide comprising a polarization-selective input grating for coupling the light beam into the pupil-replicating waveguide, wherein the polarization-selective input grating is disposed proximate the exit pupil of the beam scanner for receiving the light beam reflected by the second curved reflector.

16. The near-eye display of claim 15, wherein:
the first curved reflector and the first tiltable reflector are disposed on opposite sides of the beamsplitter;
the second curved reflector and the second tiltable reflector are disposed on opposite sides of the beamsplitter; and
the first curved reflector comprises an opening for coupling the light beam from the light source to the beamsplitter.

17. The near-eye display of claim 16, wherein the beamsplitter comprises a polarization beamsplitter (PBS) configured to reflect light having a first polarization state and to transmit light having a second polarization state orthogonal to the first polarization state, the beam scanner further comprising:
a first quarter-wave waveplate (QWP) disposed in an optical path between the PBS and the first curved reflector and configured to convert polarization of the light beam upon double pass through the first QWP between the first and second polarization states;
a second QWP disposed in an optical path between the PBS and the second tiltable reflector and configured to convert polarization of the light beam upon double pass through the second QWP between the first and second polarization states; and
a third QWP disposed in an optical path between the beamsplitter and the second curved reflector and configured to convert polarization of the light beam propagated therethrough to a circular polarization of a first handedness;

wherein the polarization-selective input grating is configured to propagate substantially without diffraction circularly polarized light of the first handedness, and to diffract circularly polarized light of a second handedness opposite to the first handedness.

18. The near-eye display of claim 15, wherein the polarization-selective input grating comprises a polarization volume hologram.

19. The near-eye display of claim 15, further comprising a controller operably coupled to the light source and the first and second tiltable reflectors and configured to:
operate the first and second tiltable reflectors to cause the light beam at the exit pupil of the beam-folded pupil relay to have a beam angle corresponding to a pixel of an image to be displayed; and
operate the light source in coordination with operating the first and second tiltable reflectors, such that the light beam has brightness corresponding to the pixel of the image to be displayed.

20. The near-eye display of claim 19, wherein the first and second tiltable reflectors are both tiltable about two axes, the near-eye display further comprising an eye tracker operably coupled to the controller and configured to determine a gaze direction of a user of the near-eye display, wherein the controller is further configured to:
operate the first tiltable reflector to scan the light beam to form an image in angular domain for displaying to the user;
use the eye tracker to determine the gaze direction of the user; and
operate the second tiltable reflector to shift a field of view towards the gaze direction of the user.

* * * * *